US008451727B2

(12) United States Patent
Tamura

(10) Patent No.: US 8,451,727 B2
(45) Date of Patent: May 28, 2013

(54) APPARATUS AND METHOD FOR CONTROLLING CONGESTION OCCURRENCE IN A COMMUNICATION NETWORK

(75) Inventor: Yoshio Tamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 249 days.

(21) Appl. No.: 12/823,176

(22) Filed: Jun. 25, 2010

(65) Prior Publication Data

US 2011/0002224 A1 Jan. 6, 2011

(30) Foreign Application Priority Data

Jul. 3, 2009 (JP) .................................. 2009-158963

(51) Int. Cl.
*G01R 31/08* (2006.01)
(52) U.S. Cl.
USPC ........................................................ 370/231
(58) Field of Classification Search
CPC ..... H04L 47/10; H04L 29/06095; H04L 47/12; H04L 29/06115; H04L 47/32
USPC .............. 370/229, 230, 230.1, 231, 232, 235, 370/236, 389
See application file for complete search history.

(56) References Cited

U.S. PATENT DOCUMENTS

| 6,208,619 | B1 | 3/2001 | Takeuchi |
| 2002/0194361 | A1 | 12/2002 | Itoh et al. |
| 2004/0148423 | A1 | 7/2004 | Key et al. |
| 2005/0047342 | A1 * | 3/2005 | Babiarz ......................... 370/232 |
| 2008/0212575 | A1 * | 9/2008 | Westberg ....................... 370/356 |
| 2009/0067335 | A1 * | 3/2009 | Pelletier et al. ............... 370/238 |

FOREIGN PATENT DOCUMENTS

| JP | 10-271132 | 10/1998 |
| JP | 2004-236316 | 8/2004 |
| WO | 02/25878 | 3/2002 |

OTHER PUBLICATIONS

Ramakrishnan et al.; "Congestion Avoidance in Computer Networks with A Connectionless Network Layer Part IV: A Selective Binary Feedback Scheme for General Topologies"; DEC Technical Report; DEC-TR-510; Aug. 1987; pp. 1-13; Digital Equipment Corporation; Littleton, MA.

* cited by examiner

*Primary Examiner* — Jung Park
(74) *Attorney, Agent, or Firm* — Myers Wolin, LLC

(57) ABSTRACT

Congestion occurrence in a communication network is controlled when performing data transmission based on a first protocol between a first edge node and a second edge node. The first edge node detects a first congestion state identifying a congestion state of the first edge node, and sets first congestion information identifying the detected first congestion state to a packet that is to be transmitted from the first edge node to the second edge node. The first edge node transmits the packet having the first information to the second edge node at the time when the first edge node performs data transmission based on a second protocol from the first edge node to the second edge node, wherein the second protocol is a connectionless protocol positioned at a protocol layer higher than the first protocol.

17 Claims, 21 Drawing Sheets

FIG. 6

| ECN FIELD [ECT/CE] | ECN FIELD SENDING SIDE BEHAVIOR | ECN FIELD RECEIVING SIDE RECOGNIZED STATE | ECN FIELD RECEIVING SIDE BEHAVIOR |
|---|---|---|---|
| 00 | -NORMAL OPERATION | -NORMAL STATE | -RESTORE TRANSMISSION RATE |
| 01 | -INFORM CONGESTION IN ROUTERS ALONG COMMUNICATION ROUTE | -NORMAL IN PEER EDGE NODE -CONGESTED IN ROUTERS ALONG COMMUNICATION ROUTE | -SEND [01] TO PEER EDGE NODE -REQUEST FOR RESTRICTION ON TRANSMISSION RATE |
| 10 | -INFORM CONGESTION IN OWN EDGE NODE -REQUEST FOR RESTRICTION ON TRANSMISSION RATE | -CONGESTED IN PEER EDGE NODE -NORMAL IN ROUTERS ALONG COMMUNICATION ROUTE | -LOWER TRANSMISSION RATE |
| 11 | -INFORM CONGESTION IN ROUTERS ALONG COMMUNICATION ROUTE -INFORM CONGESTION IN OWN EDGE NODE -REQUEST FOR RESTRICTION ON TRANSMISSION RATE | -CONGESTED IN PEER EDGE NODE -CONGESTED IN ROUTERS ALONG COMMUNICATION ROUTE | -LOWER TRANSMISSION RATE |

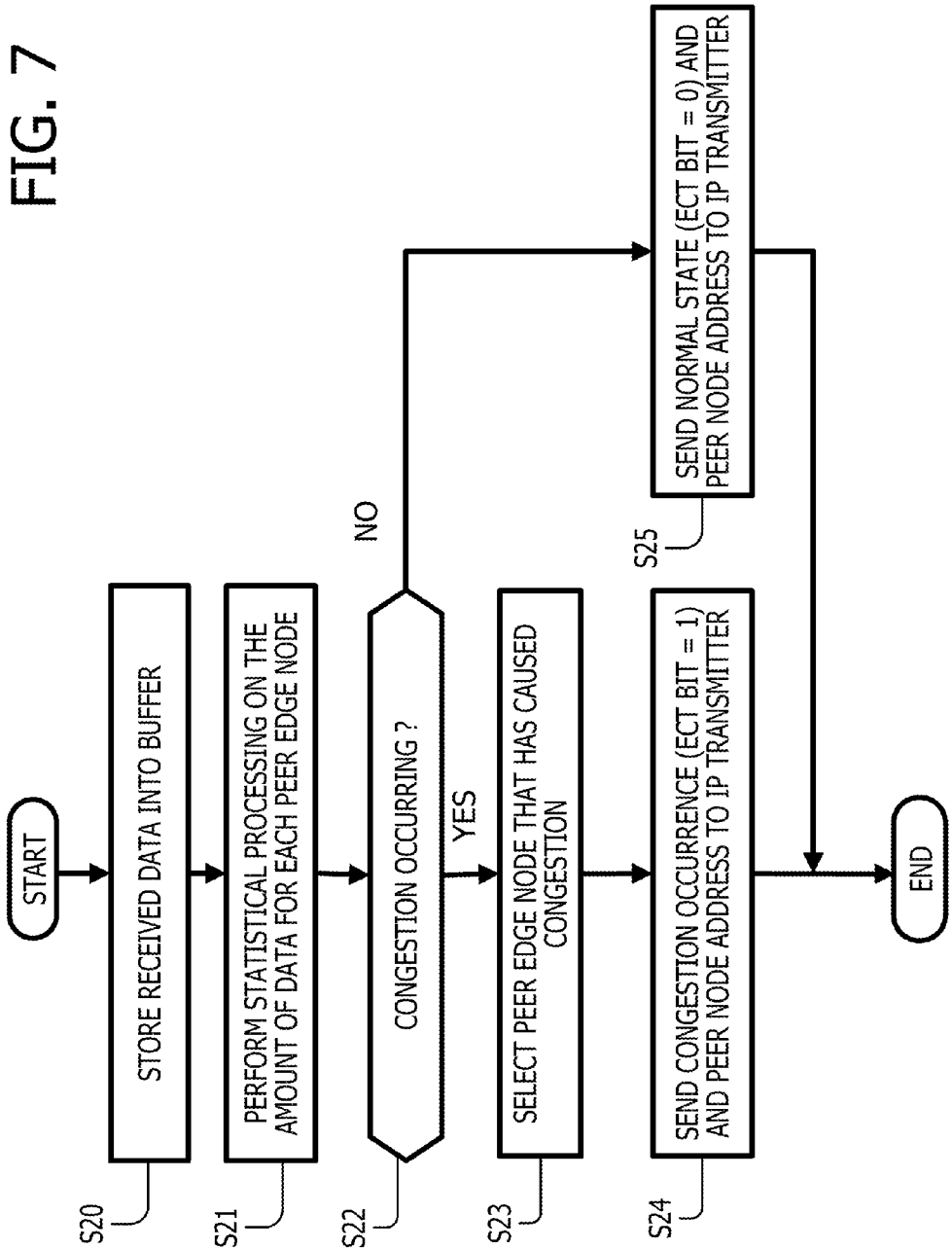

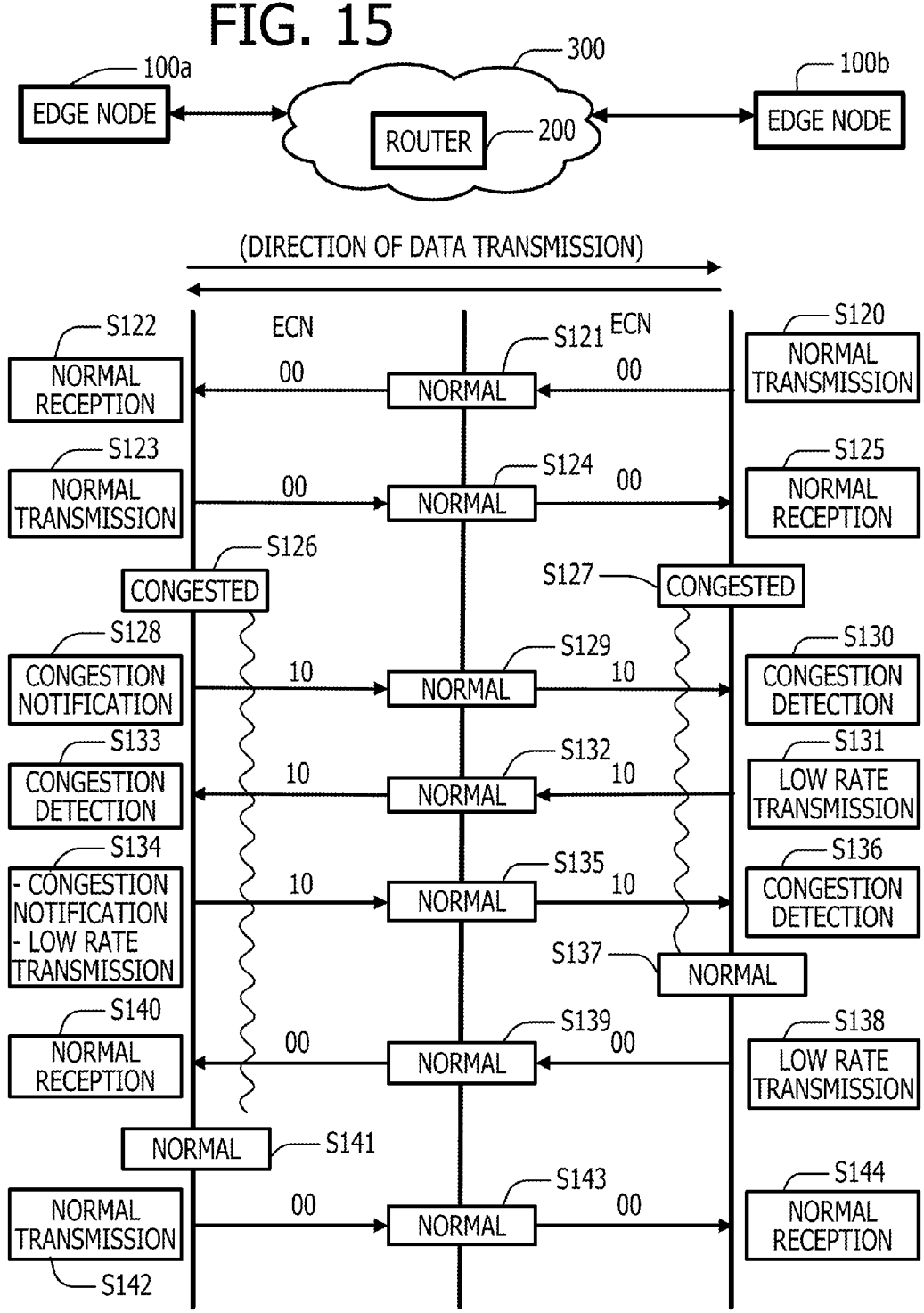

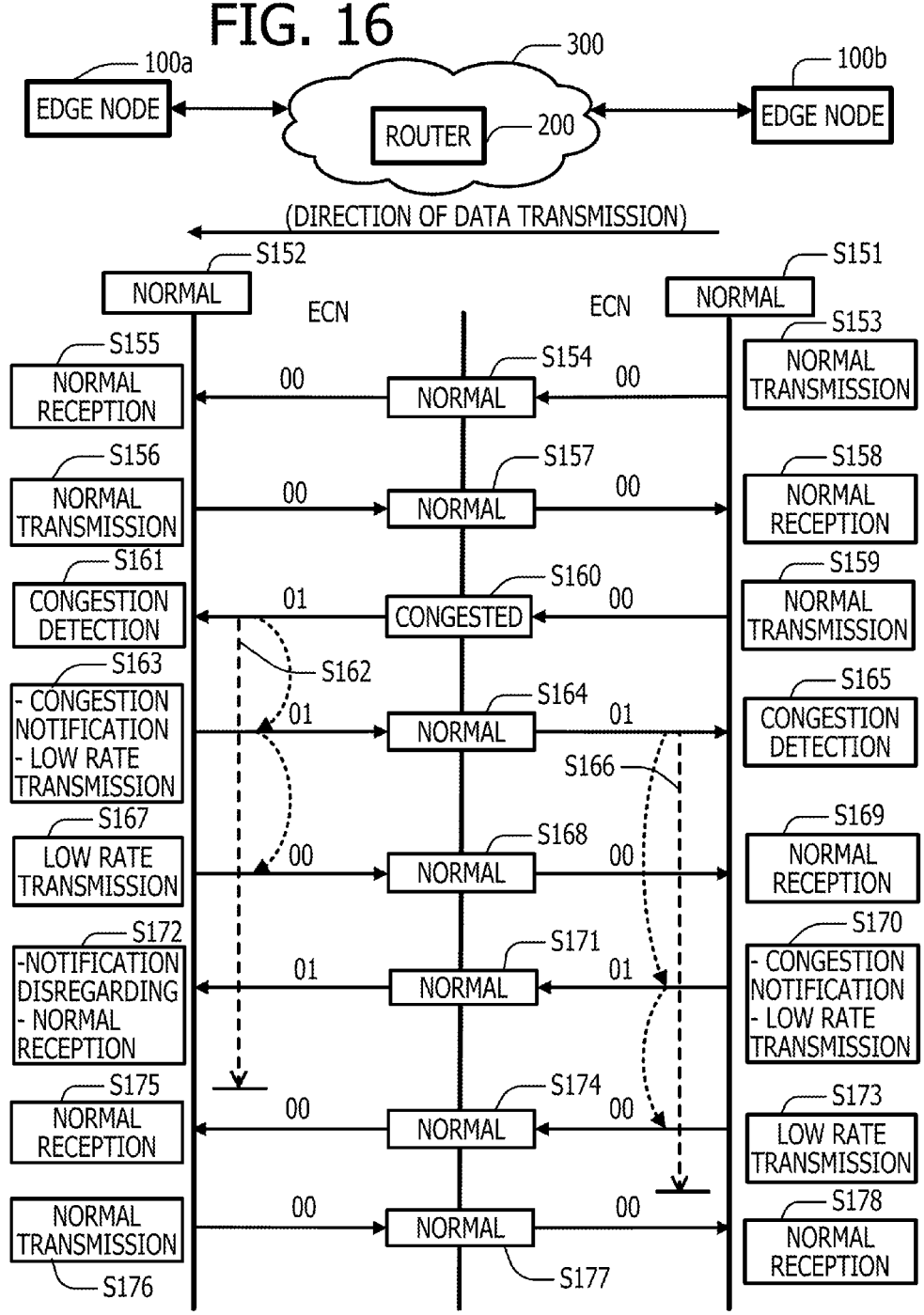

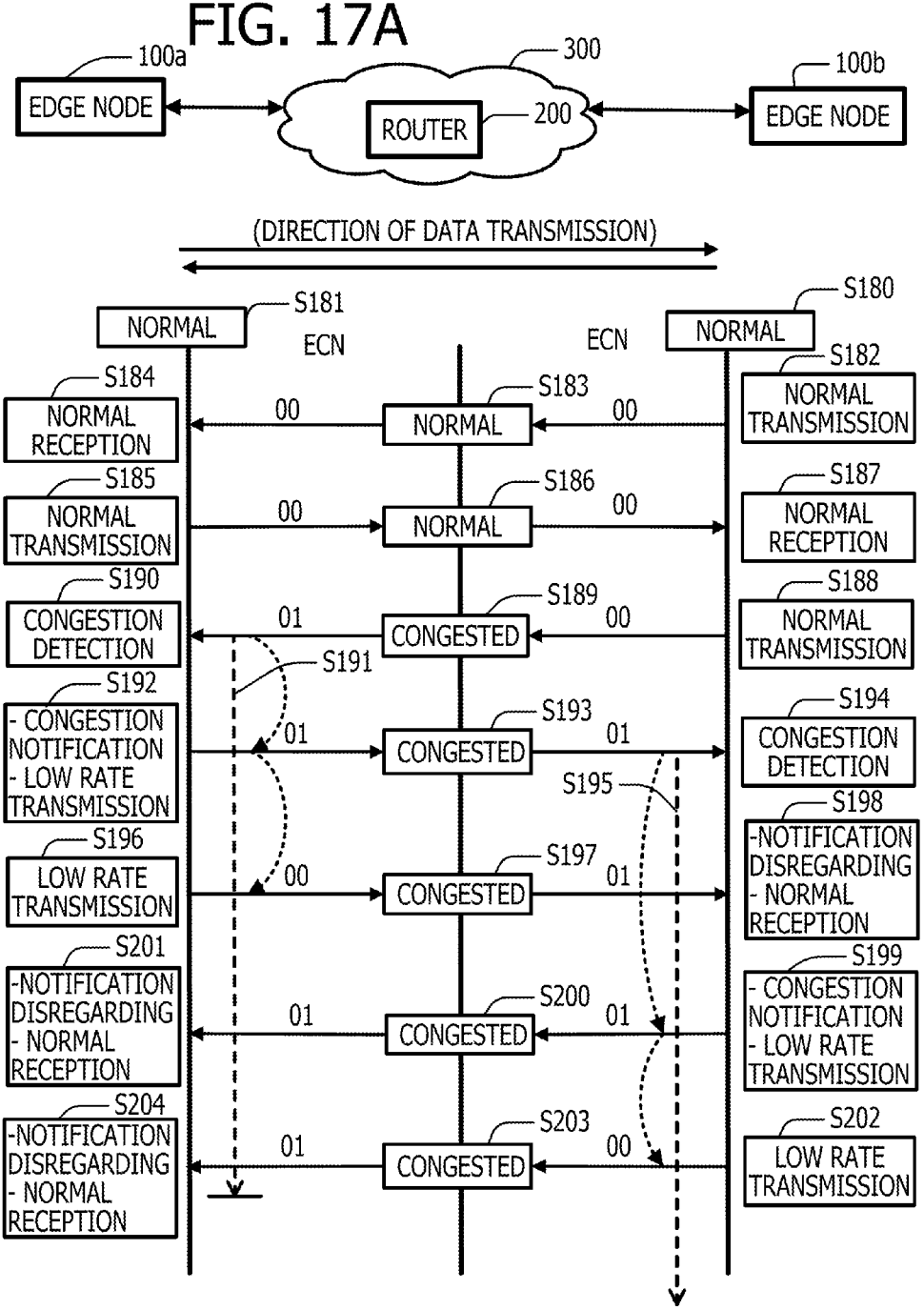

FIG. 17B
(CONTINUED FROM FIG. 17A)
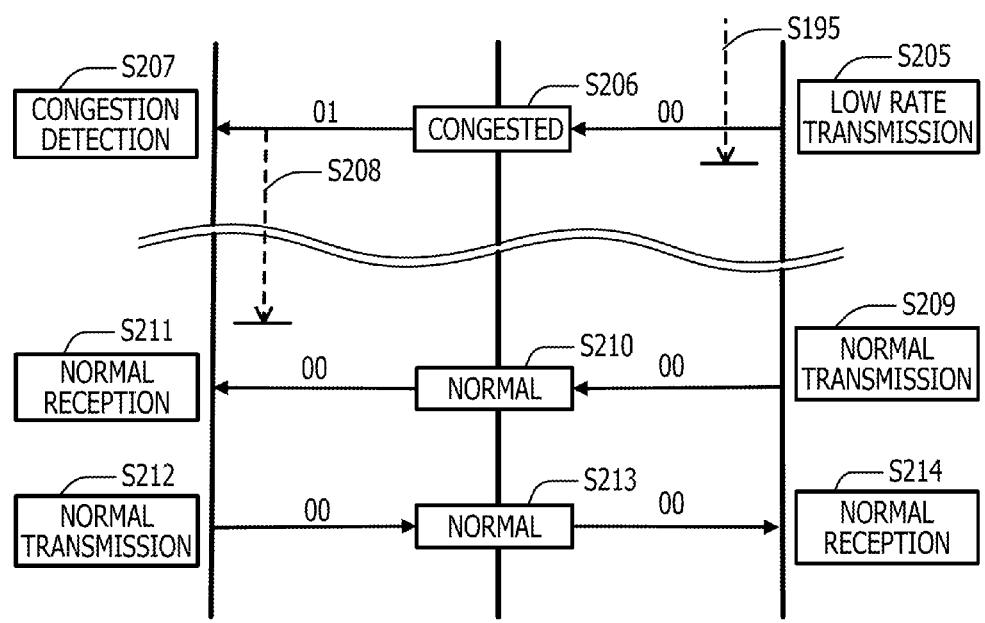

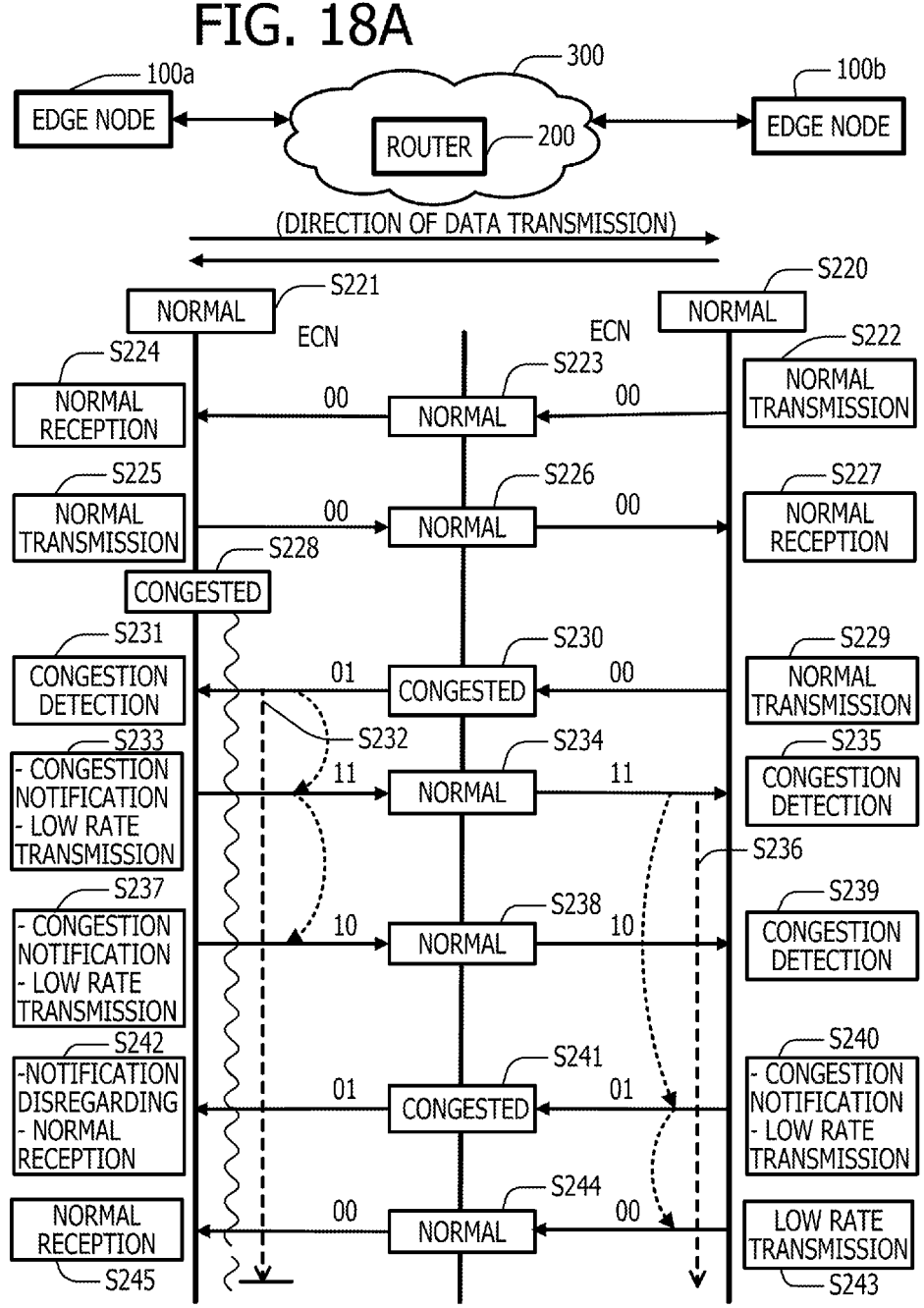

APPARATUS AND METHOD FOR CONTROLLING CONGESTION OCCURRENCE IN A COMMUNICATION NETWORK

CROSS-REFERENCE TO RELATED APPLICATION

This application is based upon and claims the benefit of priority of the prior Japanese Patent Application No. 2009-158963, filed on Jul. 3, 2009, the entire contents of which are incorporated herein by reference.

FIELD

The present invention relates to an apparatus and method for controlling congestion occurrence in a communication network.

BACKGROUND

Data transmission based on a Transmission Control Protocol/Internet Protocol (TCP/IP) is known as a method for ensuring communication reliability in Internet Protocol (IP) networks, such as the Internet and intranets, in which a connection is established between a pair of edge nodes so as to communicate with each other. Further, congestion control is known as one of mechanisms for ensuring the reliability of TCP/IP communication, in which an Explicit Congestion Notification (ECN) field is used (as shown in RFC2481, RFC3168). The ECN field is implemented using a Type of Service (ToS) field in an IP header and a control bit in a TCP header.

When congestion has occurred in an intermediate router along a communication route, the ECN field allows the intermediate router to inform a edge node of the communication route, about congestion occurrence in the intermediate router before packets begin to be dropped by the intermediate router. Upon being informed the congestion occurrence, the edge node is able to relax the congestion by putting restriction on the data transmission rate before the intermediate router begin to drop the packets.

FIG. 4 is a schematic diagram illustrating an example of an ECN field included in the ToS field of an IP header. Out of eight bits (from bit 0 to bit 7) in a ToS field 500, bit 6 and bit 7 are used as an ECN field where the bit 6 is defined as an ECT (ECN Capable Transport) bit and the bit 7 is defined as a CE (Congestion Experienced) bit.

The outline of procedures for congestion control using the ECN field based on a TCP/IP is as follows:

(1). A transmitting and receiving edge nodes establish a connection between the transmitting and receiving edge nodes by performing TCP three-way handshaking, so as to start a communication between the transmitting and receiving edge nodes. At the same time, the transmitting and receiving edge nodes perform negotiation between them as to whether the ECN field is available or not. Here, the congestion control using the ECN field becomes effective when it is confirmed that both the transmitting and receiving edge nodes are capable of using the ECN field.

(2). Upon detecting congestion occurrence, an intermediate router along the communication route between the transmitting and receiving edge nodes sets "1" to the CE bit in the IP header of a packet to be transferred.

(3). The receiving edge node, upon receiving the packet with the CE bit set at "1", recognizes that there is congestion occurrence in an intermediate router along the communication route. The receiving edge node that has recognized the congestion occurrence, makes an ECE (ECN Echo) flag of the TCP header effective.

(4). The transmitting edge node, upon receiving an ACK with the ECE flag made effective, reduces the amount of next transmission data and transmits a packet having the TCP header in which a CWR (Congestion Window Reduced) flag is made effective.

(5). The receiving edge node, upon receiving the packet having the CWR flag made effective, recognizes that the transmitting edge node has restricted the amount of transmission data.

Thus, using the ECN field allows congestion control that keeps the amount of transmission data passing through the communication route at an appropriate level, thereby avoiding retransmission and slow starting control due to packet losses even if congestion has occurred in an intermediate router along the communication route.

Further, in addition to a TCP, it is also possible to use an ECN field in combination with a communication protocol corresponding to a transport layer positioned above an IP layer, such as a SCTP (stream Control Transmission Protocol).

On the contrary, a UDP (User Datagram Protocol) is a connectionless protocol and based on best-effort communication. Although a UDP allows high-speed processing with less overhead, an ECN field is not supported by RFCs as to the UDP, and a guarantee on the communication reliability when using the UDP is entrusted to its higher layer protocol. Therefore, it is difficult to use the ECN field when the UDP is used for transmitting user data that accounts for the majority of traffic, for example, in the case of a mobile IP network. Also, it is difficult to use the ECN field in the case of a streaming protocol such as a RTP (Real-time Transport Protocol), which is used for streaming delivery service such as video distribution and music distribution since it uses the UDP as a communication protocol.

As mentioned above, since it is difficult to perform UDP based flow control on the congestion that has occurred in a reception node or in an intermediate router along a communication route, there may be no other choices left but to perform flow control based on other communication protocol positioned at a protocol layer higher than a transport layer.

In connection with a data transmission based on a UDP, international publication No. 2002/025878 suggests a communication method for transmitting data at an appropriate transmission rate that is determined by measuring a reciprocating propagation delay time along a communication route so as to improve transmission quality.

However, according to the above suggestion, data transmission is required to be temporally stopped when changing a transmission rate, and it is difficult for a transmitting node to detect congestion that has occurred in a receiving node.

SUMMARY

According to an aspect of an embodiment, there is provided apparatus and method for controlling congestion occurrence in a communication network. When performing data transmission based on a first protocol between a first edge node and a second edge node, the first edge node detects a first congestion state identifying a congestion state of the first edge node, and sets first congestion information identifying the detected first congestion state, to a packet. The packet is transmitted from the first edge node to the second edge node at the time when the first edge node performs data transmission based on a second protocol from the first edge node to the second edge node, wherein the second protocol is a connectionless protocol positioned at a protocol layer higher than the first protocol.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF DRAWINGS

FIG. 6 is a diagram illustrating an example of a configuration of an ECN field, according to a second embodiment;

FIG. 7 is a diagram illustrating an example of an operational flowchart for buffering received data, according to a second embodiment;

FIG. 15 is a diagram illustrating an example of an operational flow of ECN processing, according to a second embodiment;

FIG. 16 is a diagram illustrating an example of an operational flow of ECN processing, according to a second embodiment;

FIGS. 17A and 17B are diagrams illustrating an example of an operational flow of ECN processing, according to a second embodiment;

FIGS. 18A and 18B are diagrams illustrating an example of an operational flow of ECN processing, according to a second embodiment.

DESCRIPTION OF EMBODIMENTS

Recently, with improvement in the quality of transmission lines, it has been desired that a large amount of data is transmitted at high speed with high reliability, where a bit missing is not allowed even when performing data transmission based on a connectionless protocol such as a UDP.

For example, mobile terminals communicate with each other by performing communication between a mobile terminal and a base station, and by performing communication among base stations via a core network. Here, in routers that are major devices constituting the core network, congestion occurrences have been reduced recently since the routers have become high-capacity and load distribution has been considered.

On the contrary, a base station, which is an access device to the core network and functions as one of edge node devices, is positioned at an end of IP data transmission. Therefore, congestion may occur easily in the base station when traffic is concentrated due to handovers in a certain area, such as an urban area, a densely-populated area, or an area where an event is ongoing. In the above mentioned case of the communication among mobile terminals, it is desirable to reduce the amount of packets that are discarded due to congestion within the core network via which base stations are coupled, without relying on retransmission control between end points (mobile terminals).

Figure 1:
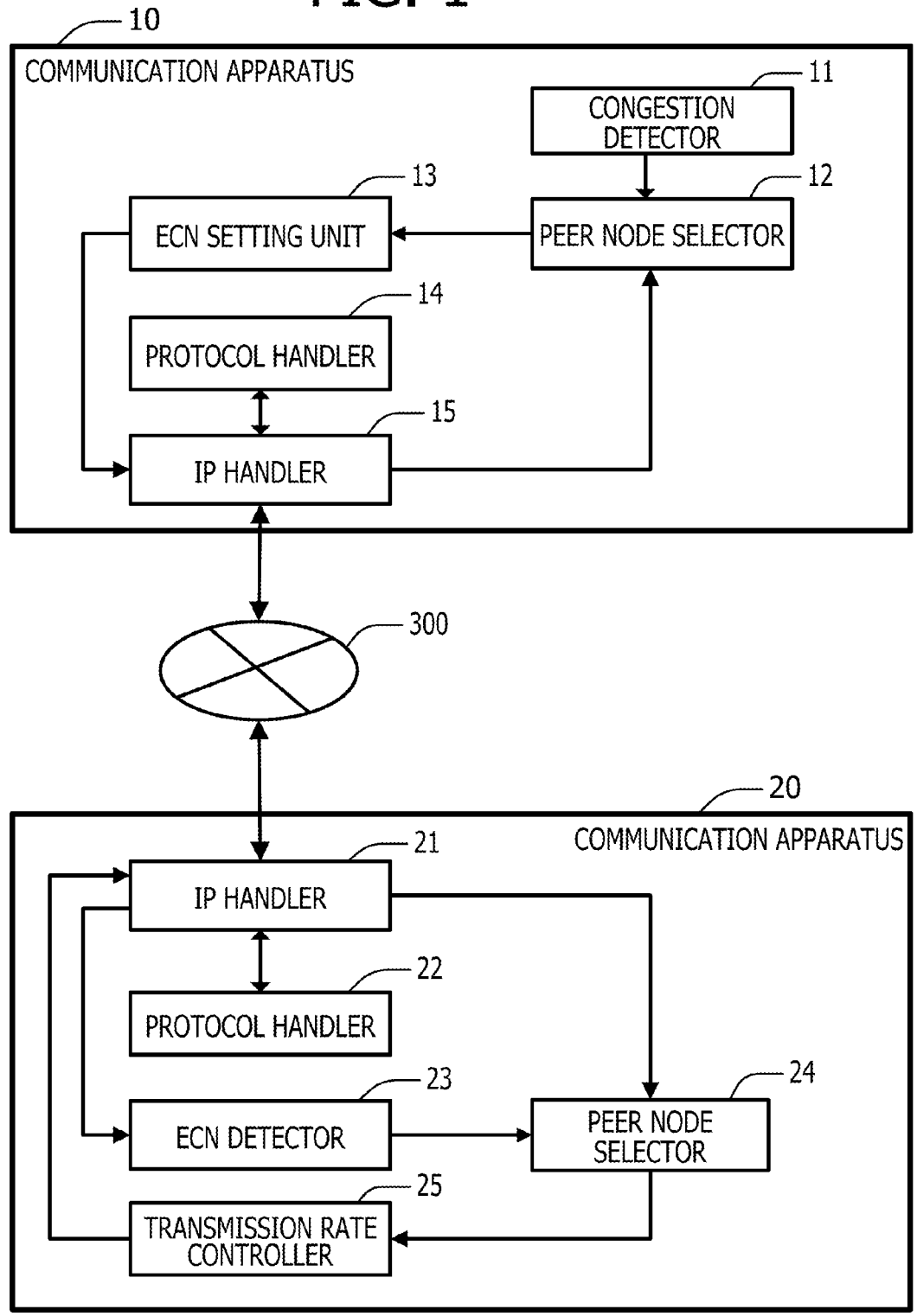
FIG. 1 is a schematic diagram illustrating an example of configuration of a communication apparatus, according to a first embodiment.

FIG. 1 is a schematic diagram illustrating an example of configuration of a communication apparatus, according to a first embodiment. A communication apparatus 10, 20 functions as edge nodes each coupled to an IP network 300, such as base stations in a mobile communication system. Hereinafter, a communication apparatus will be also described as "an edge node". The IP network 300 is a communication network based on an IP (Internet Protocol) and includes at least one intermediate router along a communication route between the communication apparatuses 10 and 20, which are not depicted in FIG. 1. The IP network 300 may be coupled to edge nodes different from the communication apparatus 10 and 20, which are not depicted in FIG. 1.

The communication apparatus 10 may be configured to include, for example, a congestion detector 11, a peer node selector 12, an ECN setting unit 13 (functioning as a congestion information setting unit), a protocol handler 14 (functioning as a second protocol handler), and an IP handler 15 (functioning as a first protocol handler). Here, the protocol handler 14 performs data transmission based on a connectionless protocol such as a UDP. The communication apparatus 10 may communicate, via the IP network 300, with one or more edge nodes including the communication apparatus 20, which are not depicted in FIG. 1. The congestion detector 11 detects a first congestion state identifying a congestion state in the communication apparatus 10, for example, by monitoring an overflow occurrence of receiving buffer in the communication apparatus 10, or by monitoring signs thereof.

The peer node selector 12 selects, from among the one or more edge nodes, a first peer edge node that has caused congestion occurrence in the communication apparatus 10, by referencing to the IP addresses of edge nodes with which the communication apparatus 10 has communicated.

When the congestion detector 11 has detected congestion occurrence in the communication apparatus 10, the ECN setting unit 13, sets first congestion information identifying the congestion occurrence (for example, a value "1") to the ECT bit of the ECN field included in the ToS field 500 of the IP packet that has the destination IP address assigned to the first peer edge node selected by the peer node selector 12.

The protocol handler 14 provides a communication service between communication ports in a layer higher than the IP layer. The protocol handler 14 builds a connectionless-type packet (also called "a datagram") by setting header information for a connectionless protocol (for example, a UDP) to the connectionless-type packet to be transmitted.

The IP handler 15 builds an IP packet by adding an IP header to the connectionless-type packet.

The communication apparatus 10 may be configured to include an IP address storage for storing, for a given time period, the IP addresses of peer edge nodes that has communicated with the communication apparatus 10. Here, it is also possible to configure the communication apparatus 10 so that only IP addresses satisfying a given condition is stored in the IP address storage, or so that the IP addresses are being stored in the IP address storage, not for the given time period, but until a given condition is satisfied.

As mentioned above, the communication apparatus 10 may be configured to inform the peer edge node about the current congestion state of the own node (the communication apparatus 10) while performing data transmission based on a connectionless protocol.

The communication apparatus 20 includes an IP handler 21 (functioning as a first protocol handler), a protocol handler 22 (functioning as a second protocol handler), an ECN detector 23 (functioning as a congestion detector), a peer node selector 24, and a transmission rate controller 25. The communication apparatus 20 communicates, via the IP network, with one or more edge nodes including the communication apparatus 10, which are not depicted in FIG. 1.

Upon receiving a connectionless-type packet via the IP network 300, the IP handler 21 passes the received connectionless-type packet to the protocol handler 22 positioned at the higher layer.

The communication apparatus 20 may be configured to include an IP address storage for storing, for a given time period, the IP addresses of peer edge nodes that have communicated with the communication apparatus 20. Here, it is also possible to configure the communication apparatus 20 so that only IP addresses satisfying a given condition are stored in the IP address storage, or so that the IP addresses are being stored in the IP address storage, not for the given time period, but until a given condition is satisfied.

The protocol handler 22 provides a communication service between communication ports in a protocol layer higher than the IP layer. The protocol handler 22 further passes the received packet to a higher layer in which, for example, application programs are executed.

The ECN detector 23 of the communication apparatus 20 detects a congestion state in the communication apparatus 10, by referring to the ECT bit of the ECN field included in the ToS field 500 that is included in the IP header of the received IP packet.

The peer node selector 24 selects, from among the one or more edge nodes, a peer edge node that has set the first congestion information to the received IP packet, based on the detection result of the ECN detector 23 and the IP addresses of edge nodes that have communicated with the communication apparatus 20, and informs the transmission rate controller 25 about the selection result.

The transmission rate controller 25 changes (for example, decrements) a transmission rate at which IP packets are transmitted to the selected peer edge node in which the congestion has occurred. The transmission rate may be changed, for example, by changing bandwidth using a method of an output queue traffic shaping (incrementing/decrementing the amount of output data per time unit).

Thus, the communication apparatus 20 may be configured to perform control for relaxing congestion occurrences in the peer edge node while performing communication, based on a connectionless-type protocol, with the peer edge node.

A Second Embodiment

Figure 2:
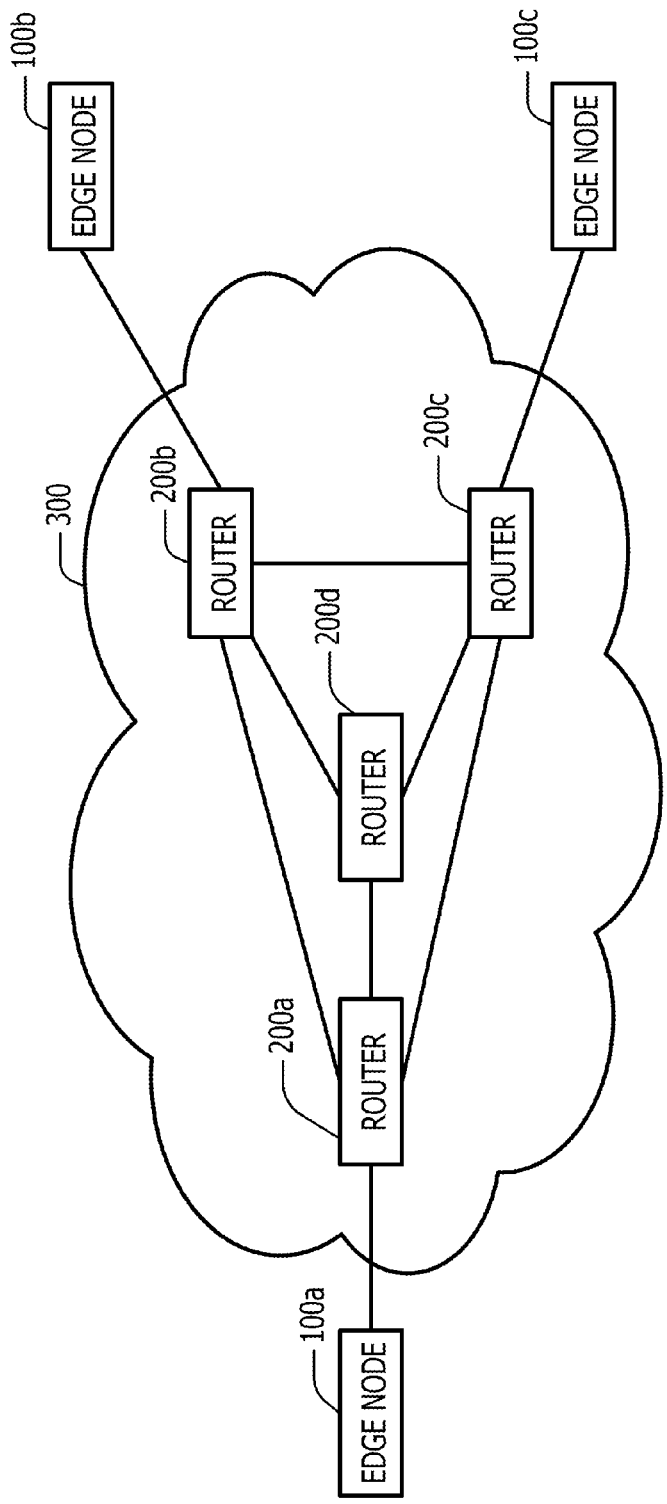
FIG. 2 is a diagram illustrating an example of an IP network, according to a second embodiment.

FIG. 2 is a diagram illustrating an example of an IP network, according to a second embodiment.

In FIG. 2, an IP network 300 is a core network, and includes edge nodes (communication apparatuses) 100*a*, 100*b*, 100*c*, and intermediate routers 200*a*, 200*b*, 200*c*, 200*d*. Hereinafter, an intermediate router will be abbreviated as "a router" in some cases. Here, a core network means "a backbone network", and, for example, in the case of communication among telecommunications carriers or among mobile terminals, a network that is used for communication among carriers or among base stations belonging to the carriers may be considered as a core network.

An IP address is assigned to each of network devices, and the network devices are capable of communicating with each other based on an IP (Internet Protocol). A pair of routers included in the intermediate routers 200*a*, 200*b*, 200*c*, 200*d* are coupled with each other directly or indirectly via another router different from the pair of routers, and capable of communicating with each other via a plurality of communication routes. In addition to a router, a layer 3 switch may be used as a network device.

Edge nodes 100*a*, 100*b*, 100*c* communicate with each other based on a protocol such as a TCP or a UDP that are positioned at a protocol layer (transport layer) higher than an IP layer. Here, the edge node 100*a* may be, for example, a base station capable of communicating with a mobile station which is not depicted in FIG. 2. Also, the edge nodes 100*a*, 100*b*, 100*c* are not limited to base stations, and may be servers for providing various services.

In the network mentioned above, congestion may occur when communication loads of the network devices included in the IP network 300 increase. For this reason, the network devices are provided with functions for preventing or eliminating congestion.

Figure 3:
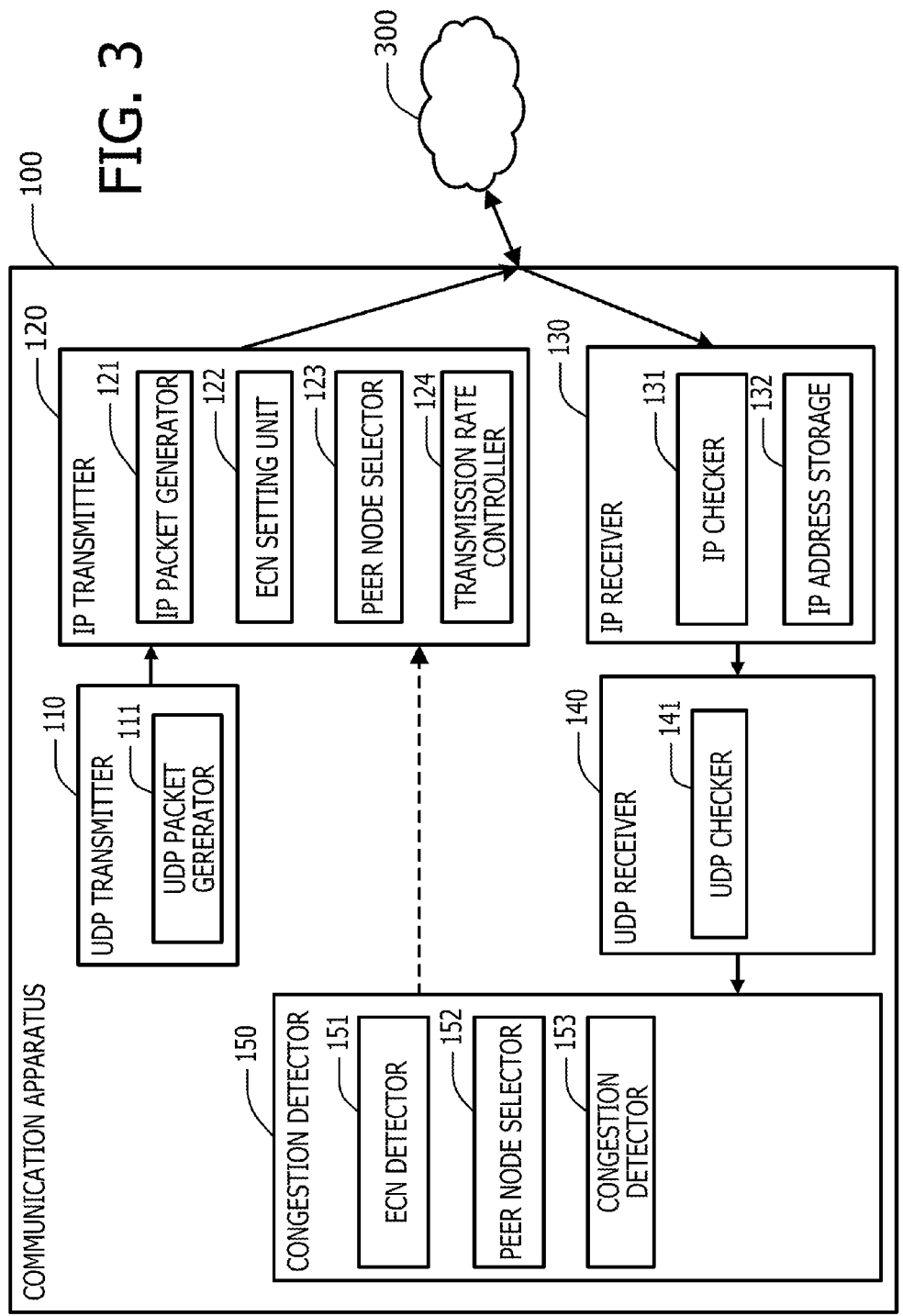
FIG. 3 is a diagram illustrating an example of a configuration of a communication apparatus, according to a second embodiment.

FIG. 3 is a diagram illustrating an example of a configuration of a communication apparatus, according to a second embodiment.

A communication apparatus 100 includes a UDP transmitter 110, an IP transmitter 120, an IP receiver 130, a UDP receiver 140, and a congestion detector 150. The communication apparatus 100 is coupled to an IP network 300, and communicates with one or more edge nodes, based on a UDP. For example, in FIG. 2, each of the nodes 100*a*, 100*b*, 100*c* may be operated as the communication apparatus 100.

The UDP transmitter 110 receives transmission data from the higher protocol layer and sends a UDP packet including the received transmission data to the IP transmitter 120. The UDP transmitter 110 includes a UDP generator 111 which generates a UDP packet by adding a UDP header to the transmission data received from the higher layer. The UDP header includes a source port number, a destination port number, a data length, and a checksum. However, a UDP itself does not have a mechanism for avoiding congestion. In addition to a UDP, a protocol called "a connectionless-type protocol" or "a best-effort-type protocol" may be used as a transport layer protocol.

The IP transmitter 120, upon receiving a UDP packet from the UDP transmitter 110, transmits an IP packet including the received UDP packet, to a peer edge node coupled to the IP network. The IP transmitter 120 includes an IP packet generator 121, an ECN setting unit 122, a first peer node selector 123, and a transmission rate controller 124.

The IP generator 121 generates an IP packet by adding an IP header to the UDP packet received from the UDP transmitter 110.

Figure 4:
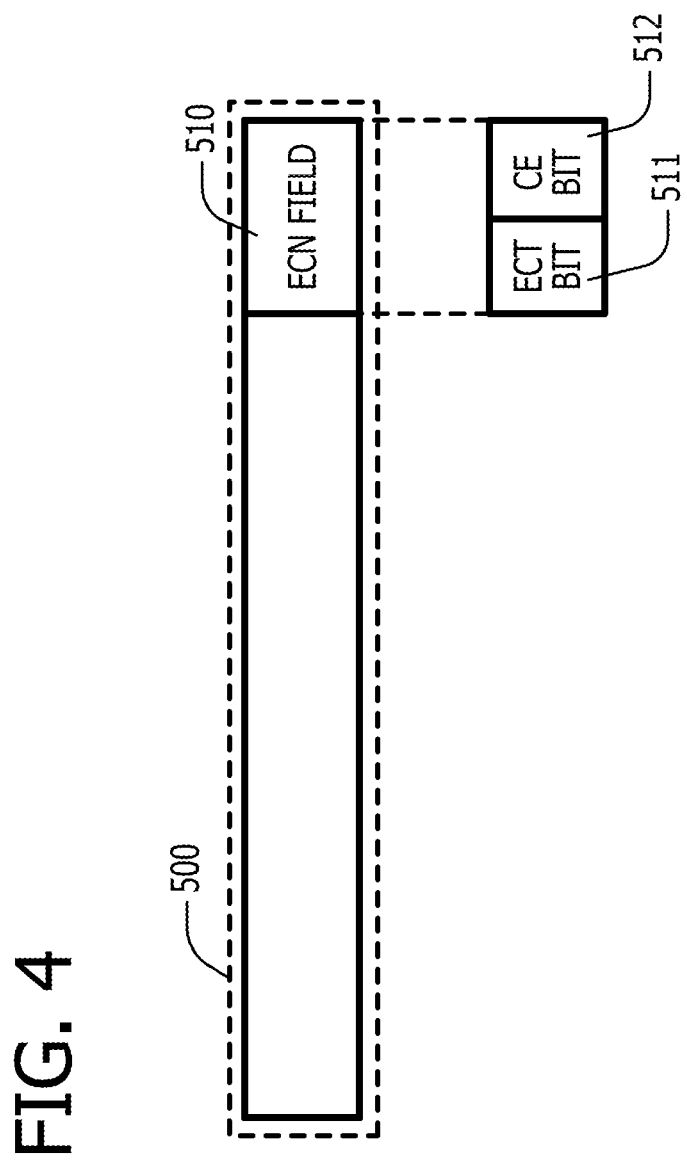
FIG. 4 is a schematic diagram illustrating an example of an ECN field included in the ToS field of an IP header.

The ECN setting unit 122 sets congestion information identifying a congestion state to the ECN field of a ToS field that is stored in the IP header of the packet destined for the peer edge node to which the congestion state is to be notified. For example, out of the ToS field in which bit data is numbered from 0 to 7, the bits 6 and 7 may be used as the ECN field in which, for example, bit 6 is an ECT bit and bit 7 is a CE bit, as depicted in FIG. 4. The ECN setting unit 122 sets first congestion information identifying a congested state (for example, a value 1) of the communication apparatus 100, to the ECT bit when informing the peer edge node about the congestion state of the communication apparatus 100. Further, the ECN setting unit 122 sets second information identifying a congested state (for example, a value 1) of at least one intermediate router along the communication route, to the CE bit when receiving an IP packet including a CE bit having a value indicating a congested state (for example, a value 1) set by the intermediate router along the communication route that has detected a congested state. Details on the processing of the ECN setting unit 122 for setting congestion information to the ECT bit and the CE bit, will be described later.

The first peer node selector 123 selects, from among one or more edge nodes, a first peer edge node that has caused congestion occurrence in the communication apparatus 100, by referring to the IP addresses stored in an IP address storage 132 which will be described later. The transmission rate controller 124 changes a transmission rate (for example, reducing the transmission rate) at which data is transmitted to the peer edge node staying in a congested state. The change of the transmission rate may be performed, for example, by bandwidth changing based on traffic shaping of output queues.

The IP receiver 130 extracts the UDP packet from the IP packet that is transmitted from the peer edge node via the IP network, and sends the extracted UDP packet to the UDP receiver 140. The IP receiver 130 includes an IP checker 131 and an IP address storage 132. The IP checker 131 checks check sum data stored in the IP header of the received IP packet, and discard the received IP packet when it is determined that data stored in the IP header is corrupted. Further, the IP checker 131 checks a protocol number stored in the IP header. For example, the IP checker 131 determines that a protocol corresponding to the next higher layer is a UDP when the protocol number is "11". The IP address storage 132 stores the source IP address of the received IP packet. Details on storage of the IP address will be described later.

The UDP receiver 140 receives a UDP packet from the IP receiver 130, and passes the data stored in the received UDP packet to an application in the next higher layer. The UDP receiver 140 includes a UDP checker 141. The UDP checker 141 extracts the payload data from the UDP packet that is received from the IP receiver 130, and passes the extracted payload data to the application in the next higher layer, based on a port number specified by the UDP header.

The congestion detector 150 detects a first congestion state identifying a congestion state of the communication apparatus 100, and informs the IP transmitter 120 about the detected first congestion state and the IP address of the peer edge node to be informed about the detected first congestion state. The congestion detector 150 includes an ECN detector 151, a second peer node selector 152, and a first congestion detector 153. The ECN detector 151 detects a first congestion state identifying a congestion state of the peer edge node by referring to the ECT bit of ECN field stored in the ToS field 500 of the IP header. Further, the ECN detector 151 detects a second congestion state identifying a congestion state of at least one intermediate router along the communication route between the communication apparatus 100 and the peer edge node, by checking a CE bit of the ECN field stored in the ToS field 500 of the received IP header. The peer node selector 152 determines whether the ongoing communication is a communication to the peer edge node staying in a congested state or not, based on the detection result of the ECN detector 151 and the IP addresses stored in the IP address storage 132, and further selects a second peer edge node to which the detected second congestion state is to be notified. The first congestion detector 153 detects, as a first congestion state, a congestion state of the communication apparatus 100.

According to the above mentioned configuration, even in the case of a communication based on a UDP, the communication apparatus 100 may be configured to perform congestion control, based on the congestion states of the communication apparatus 100 and the at least one intermediate node along the communication route, with the advantage of the UDP: the capability to perform data transmission with less overhead.

In the above description, an ECN field is employed as a typical example of congestion information. Also, an ECT bit is employed for a typical example for first congestion information identifying a first congestion state of the communication apparatus, and a CE bit is employed as a typical example for second congestion information identifying a second congestion state of at least one intermediate router along the communication route between a pair of edge node. However, assignment of the first and second congestion information to areas within a packet is not limited to the above ECN field. Further, in the above description, the IP network will be used as a typical example for data transmission among edge nodes. However, a type of a communication network is not limited to the IP network. Therefore, a communication protocol other than an IP may be employed as a first protocol, and a communication protocol other than a UDP may be employed as a second protocol higher than the first protocol.

Figure 5:
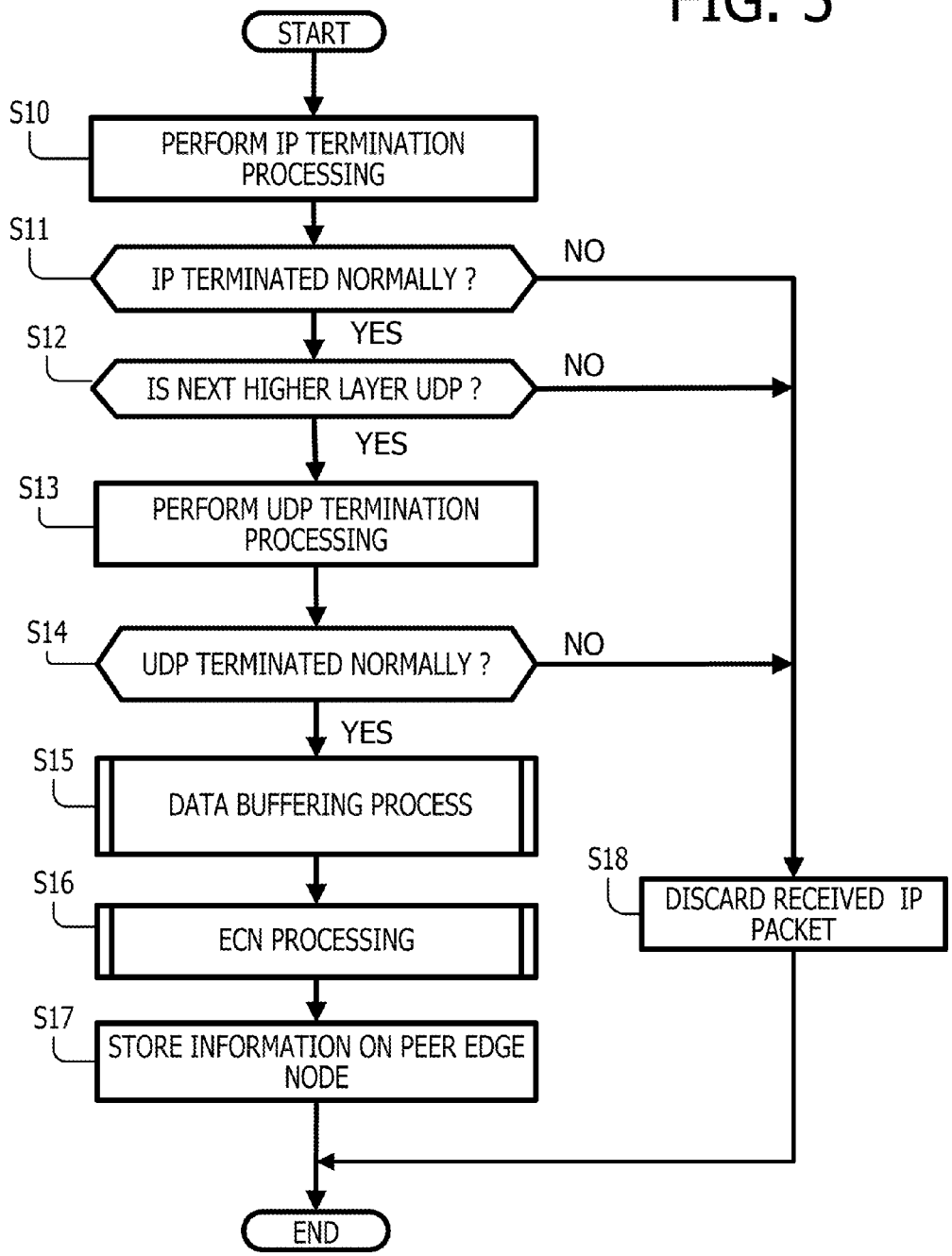
FIG. 5 is a diagram illustrating an example of an operational flowchart for reception processing performed by a communication apparatus, according to a second embodiment.

FIG. 5 is a diagram illustrating an example of an operational flowchart for reception processing performed by a communication apparatus, according to a second embodiment. A communication apparatus 100 starts reception processing when receiving an IP packet. Hereafter, description will be made in association with an operational number assigned to each of operations.

In operation S10, an IP receiver 130 performs IP termination processing for terminating data transmission based on an IP protocol. In the IP termination processing, a packet size, a fragment offset, a checksum, a next higher protocol, and a destination address are checked.

In operation S11, the IP receiver 130 proceeds to S12 when it is determined that the IP packet is received normally, by checking the packet size, the fragment offset, and the checksum of the received IP packet. When it is determined that the above checking result is abnormal, the IP receiver 130 proceeds to S18 so as to discard the received IP packet.

In operation S12, the IP receiver 130 proceeds to S13 when it is determined that the next higher protocol indicates a UDP by checking the "protocol" field of the received IP packet.

When it is determined that the next higher protocol is not a UDP, the IP receiver 130 proceeds to S18 so as to discard the received IP packet.

In operation S13, a UDP receiver 140 terminates data transmission based on a UDP protocol by checking a checksum stored in the header of the received UDP packet (the payload of the received IP packet).

In operation S14, the UDP receiver 140 proceeds to S15 when it is determined that the UDP packet is received normally by checking the checksum in the UDP header. When the result of checking the checksum is abnormal, the UDP receiver 140 proceeds to S18 so as to discard the received UDP packet In operation S15, the communication apparatus 100 performs data buffering process in which the received data (the payload of the received UDP packet) is accumulated in a reception buffer. Details on the data buffering process will be described later with reference to FIG. 7.

In operation S16, the communication apparatus 100 performs ECN processing. A congestion detector 150 examines a congestion state (a first congestion state) of the peer edge node by checking the ECT bit of an ECN field stored in the ToS field of the IP header. Further, the congestion detector 150 examines a congestion state (a second congestion state) of at least one intermediate router along the communication route between the communication apparatus and the peer edge node by checking the CE bit of the ECN field stored in the ToS field of the received IP header. Then, the congestion detector 150 determines second congestion information identifying the detected second congestion state, which is to be sent to the peer edge node. Details on ECN processing performed in operation S16 will be described with reference to FIG. 8.

In operation S17, the IP receiver 130 stores information on the peer edge node, that is, the destination node of data transmission based on the IP protocol, and ends the reception processing. For example, the IP receiver 130 stores a source IP address of the received IP packet in the memory for a given time period, and clears the stored source IP address when the given time period has elapsed.

In operation S18, the communication apparatus 100 discards the received IP packet.

FIG. 6 is a diagram illustrating an example of a configuration of an ECN field, according to a second embodiment, in which the definition of ECN bits are expressed in a tabular form, as a table 520.

The table 520 defines the behaviors of ECN field sending side and ECN field receiving side, in association with each 2-bit value of the ECN field.

In the case of the ECN field [ECT/CE] being equal to "00", a communication apparatus 100 serving as the sending side of ECN field is operated normally. Further, a communication apparatus 100 serving as the receiving side of ECN field recognizes a normal state by determining that there is no congestion occurring in the communication apparatus 100 on the sending side and the at least one intermediate routers along the communication route between two communication apparatuses 100 serving as the sending and receiving sides, respectively. In the case, the communication apparatus 100 on the receiving side of ECN field restores a transmission rate to the original transmission rate if the current transmission rate has been changed from the original transmission rate (for example, the rate has been reduced).

In the case of ECN field [ECT/CE] being equal to "01", the communication apparatus 100 serving as a sending side of the ECN bits (hereinafter, also expressed as "sending side apparatus 100") informs the communication apparatus 100 serving as a receiving side of ECN field (hereinafter, also expressed as "receiving side apparatus 100"), that there is no congestion occurring in the sending side apparatus 100 and there is congestion occurring in at least one intermediate router along the communication route between the sending-side and receiving-side apparatuses 100. Further, the receiving-side apparatus 100 recognizes that there is no congestion occurring in the sending-side apparatus 100 and there is congestion occurring in the at least one intermediate router along the communication route between the sending-side and receiving-side apparatuses 100. In the case, the receiving-side apparatus 100 request the sending-side apparatus 100 to put restriction on the transmission rate thereof by transmitting the ECN field [ECT/CE] having a 2-bit value "01" to the sending-side apparatus 100 at the time of performing data transmission based on a UDP.

In the case of the ECN field [ECT/CE] being equal to "10", the sending-side apparatus 100 informs the receiving-side apparatus 100 that there is congestion occurring in the sending-side apparatus 100. Further, the sending-side apparatus 100 requests the receiving-side apparatus 100 to put restriction on the transmission rate in the case of data transmission based on a UDP. The receiving-side apparatus 100 recognizes that there is congestion occurring in the sending-side apparatus 100 and there is no congestion occurring in at least one intermediate router along the communication route between the sending-side and receiving-side apparatuses 100. Here, in the case of data transmission based on a UDP, the receiving-side apparatus 100 transmits data to the sending-side apparatus 100 by putting restrictions on the transmission rate thereof.

In the case of ECN field [ECT/CE] being equal to "11", the sending-side apparatus 100 informs the receiving-side apparatus 100 that there is congestion occurring in the sending-side apparatus 100 and there is congestion occurring in at least one intermediate router along the communication route between the sending-side and receiving-side apparatuses 100. Further, the sending-side apparatus 100 requests the receiving-side apparatus 100 to put restriction on the transmission rate when performing data transmission based on a UDP. The receiving-side apparatus 100 recognizes that there is congestion occurring in the sending-side apparatus 100 and there is congestion occurring in at least one intermediate router along the communication route between the sending-side and receiving-side apparatuses 100. Therefore, the receiving-side apparatus 100 transmits data to the sending-side apparatus 100 by putting restriction on the transmission rate when performing data transmission based on a UDP.

As mentioned above, the ECT bit allows the sending-side apparatus 100 staying in a congestion state, to inform the receiving-side apparatus 100 that there is congestion occurring in the sending-side apparatus 100. Since the ECT bit is not modified by intermediate routers along the communication route, the receiving-side apparatus 100 is able to recognize the congestion state of the sending-side apparatus 100 by referring to the received ECT bit. Further, since the CE bit is set by an intermediate router along the communication route when congestion has occurred in the intermediate router, the CE bit may be handled without conflicting with the ECT bit.

FIG. 7 is a diagram illustrating an example of an operational flowchart for buffering received data, according to a second embodiment. The buffering of received data is performed by a congestion detector 150 of the communication apparatus 100.

In operation S20, the congestion detector 150 stores received data into a receiving buffer. The received data stored in the receiving buffer is removed from the received buffer when the received data is passed to an application positioned at the higher layer protocol.

In operation S21, the congestion detector 150 performs statistical processing on the amount of received data for each of peer edge nodes. For example, the amount of data received per unit time (such as the number of packets or the size of data) is accumulated for an IP address assigned to each of the peer edge nodes, and the amount of data received for a given time period is stored for each IP address. Here, it is also possible to configure the congestion detector 150 to store the amount of statistical data for estimating a transmission load, such as an average load during the monitoring time, or the maximum load during a partial period of the total monitoring time.

In operation S22, the congestion detector 150 determines whether congestion has occurred or not. The congestion detector 150 may be configured to monitor the amount of data stored in a receiving buffer, and to determine that congestion has occurred when the receiving buffer has overflowed with the received data, for example, when the congestion detector 150 has failed to store the received data into the receiving buffer. Further, the congestion detector 150 may be configured to determines that a congestion has occurred when there exists a chance of congestion occurrence, for example, when the amount of received data stored in the receiving buffer has exceeded a given threshold value. The congestion detector 150 proceeds to operation S23 when it is determined that a congestion has occurred (YES in operation S22), and otherwise (NO in operation S22) proceeds to operation S25.

In operation S23, the congestion detector 150 selects, from among one or more edge node (one or more communication apparatuses 100), a first peer node that has caused the congestion in the communication apparatus 100, based on the result of statistical processing on the received data. In the case of selecting a plurality of peer edge nodes as first peer nodes, the number of the plurality of peer edge nodes may be set beforehand, or it is also possible to select peer edge nodes satisfying a given condition. Further, as a criterion for determining a peer edge node that has caused the congestion, various criterions may be used, such as the peer edge node that has performed data transmission lastly, the peer edge node that performed data transmission during a given time period, or the peer edge node that has undergone a greater amount of communication load among plural peer edge nodes that performed data transmission during the given time period.

In operation S24, the congestion detector 150 inform the IP transmitter 120 about a congested state "ECT bit=1" meaning congestion occurrence and the IP address of the peer edge node determined to be responsible for the congestion, and ends processing of buffering the received data.

In operation S25, the congestion detector 150 inform the IP transmitter 120 about the congestion state of "ECT bit=0" meaning not congested and the IP address of the peer edge node, and ends processing of buffering the received data.

Figure 8:
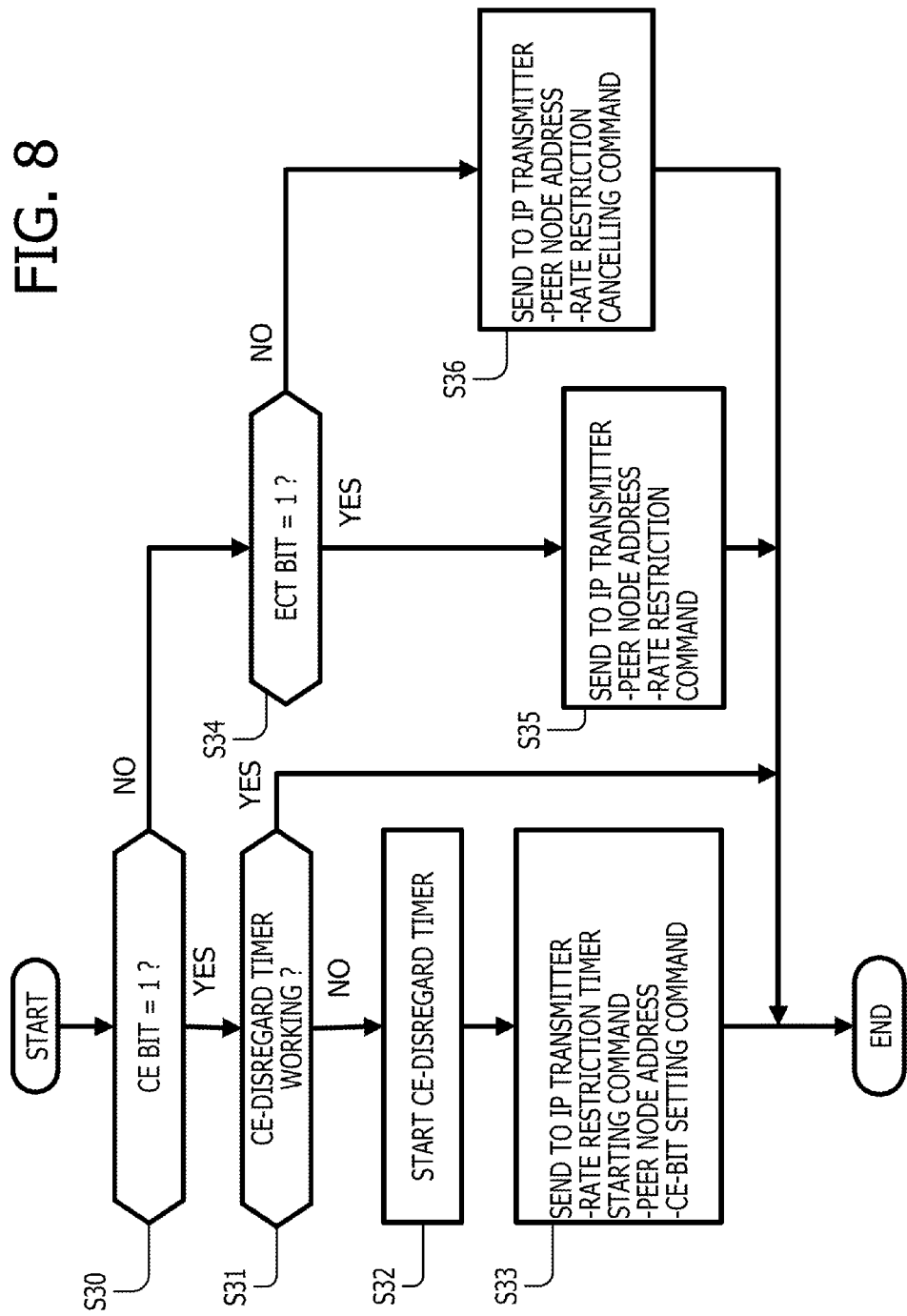
FIG. 8 is a diagram illustrating an example of an operational flowchart for ECN processing, according to a second embodiment.
Figure 9:
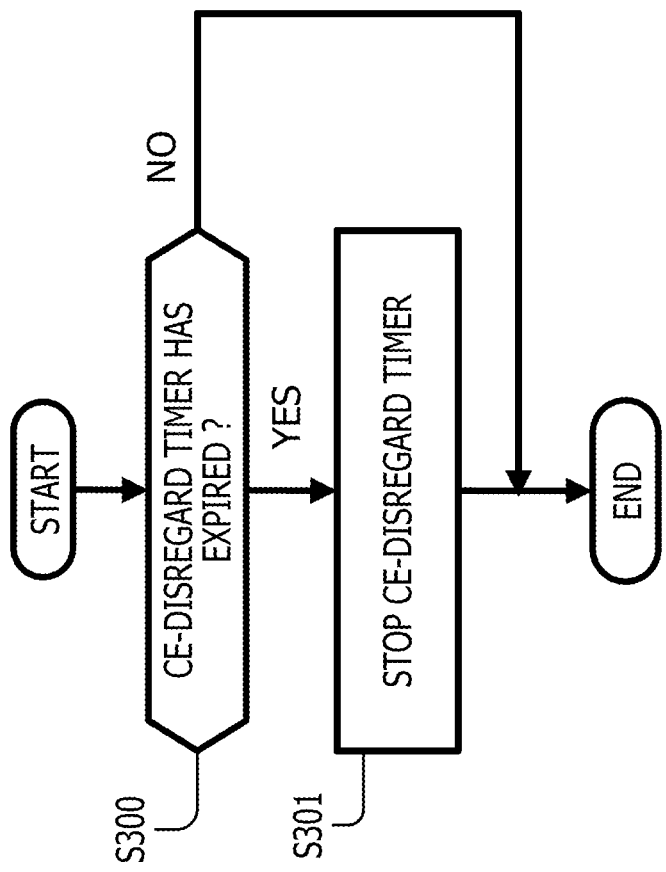
FIG. 9 is a diagram illustrating an example of an operational flowchart for CE-disregard timer processing, according to an embodiment.

Next, descriptions will be given of ECN processing which is performed in the receiving processing of the communication apparatus 100, with reference to FIG. 8 and FIG. 9. FIG. 8 is a diagram illustrating an example of an operational flowchart for ECN processing, according to a second embodiment. FIG. 9 is a diagram illustrating an example of an operational flowchart for CE-disregard timer processing. Here, the ECN processing is performed by a congestion detector 150 of a communication apparatus 100. Hereinafter, the wording "transmission rate" will be also expressed simply as "rate" in the figures.

In operation S30, an ECN detector 151 checks the CE bit of an ECN field included in the received IP packet. When the CE bit has a value "1", that is, it is determined that there is congestion occurring in intermediate routers along the communication route, the ECN detector 151 proceeds to operation S31. Meanwhile, when the CE bit has a value "0", that is, it is determined that there is no congestion occurring in intermediate routers along the communication route, the ECN detector 151 proceeds to operation S34.

In operation S31, the ECN detector 151 determines whether a CE-disregard timer is working or not. When it is determined that the CE-disregard timer is not working (NO in operation S31), the ECN detector 151 proceeds to operation S32. Meanwhile, when it is determined that the CE-disregard timer is working (YES in operation S31), the ECN detector 151 ends the ECN processing.

In operation S32, the ECN detector 151 starts the CE-disregard timer by setting a time-out value thereto. Here, the CE-disregard timer may be implemented by performing CE-disregard timer processing at the time of detecting a timer interruption (see FIG. 9). The CE-disregard timer processing determines whether the CE-disregard timer has expired or not (in operation S300). When it is determined that the CE-disregard timer has expired (YES in operation S300), the CE-disregard timer processing inform the ECN detector 151 that a time-out has occurred, and stops the CE-disregard timer (in operation S301). When it is determined that the CE-disregard timer has not expired (NO in operation S300), the CE-disregard timer processing is stopped.

As mentioned above, since the ECN detector 151 is provided with a CE-disregard timer, and disregards the CE bit for a given time period from the time when the CE bit is set at a value "1", processing to be performed when the CE bit has been set at a value "1", may be executed only once for the given time period, thereby reducing processing load.

In operation S33, the ECN detector 151 informs the IP transmitter 120 about "a transmission rate restriction timer starting command", "a peer node IP address" corresponding to the received IP packet, and "a CE-bit setting command", and ends the ECN processing. Here, the CE-bit setting command is information for instructing the IP transmitter 120 to continuously transmit a current value of the CE bit.

In operation S34, the ECN detector 151 checks an ECT bit of the ECN field stored in the received IP packet. When the ECT bit has a value "1" (YES in operation S34), that is, it is determined that there is congestion occurring in the peer edge node corresponding to the received IP packet, the ECN detector 151 proceeds to operation S35. Meanwhile, when the ECT bit has a value "0" (NO in operation S34), that is, it is determined that there is no congestion occurring in the peer edge node corresponding to the received IP packet, the ECN detector 151 proceeds to operation S36.

In operation S35, the ECN detector 151 informs the IP transmitter 120 about "a peer node IP address" corresponding to the received IP packet and "a transmission rate restriction command", and ends the ECN processing.

In operation S36, the ECN detector 151 informs the IP transmitter 120 about "a peer node IP address" corresponding to the received IP packet and "a transmission rate restriction cancelling command", and ends the ECN processing.

Figure 10:
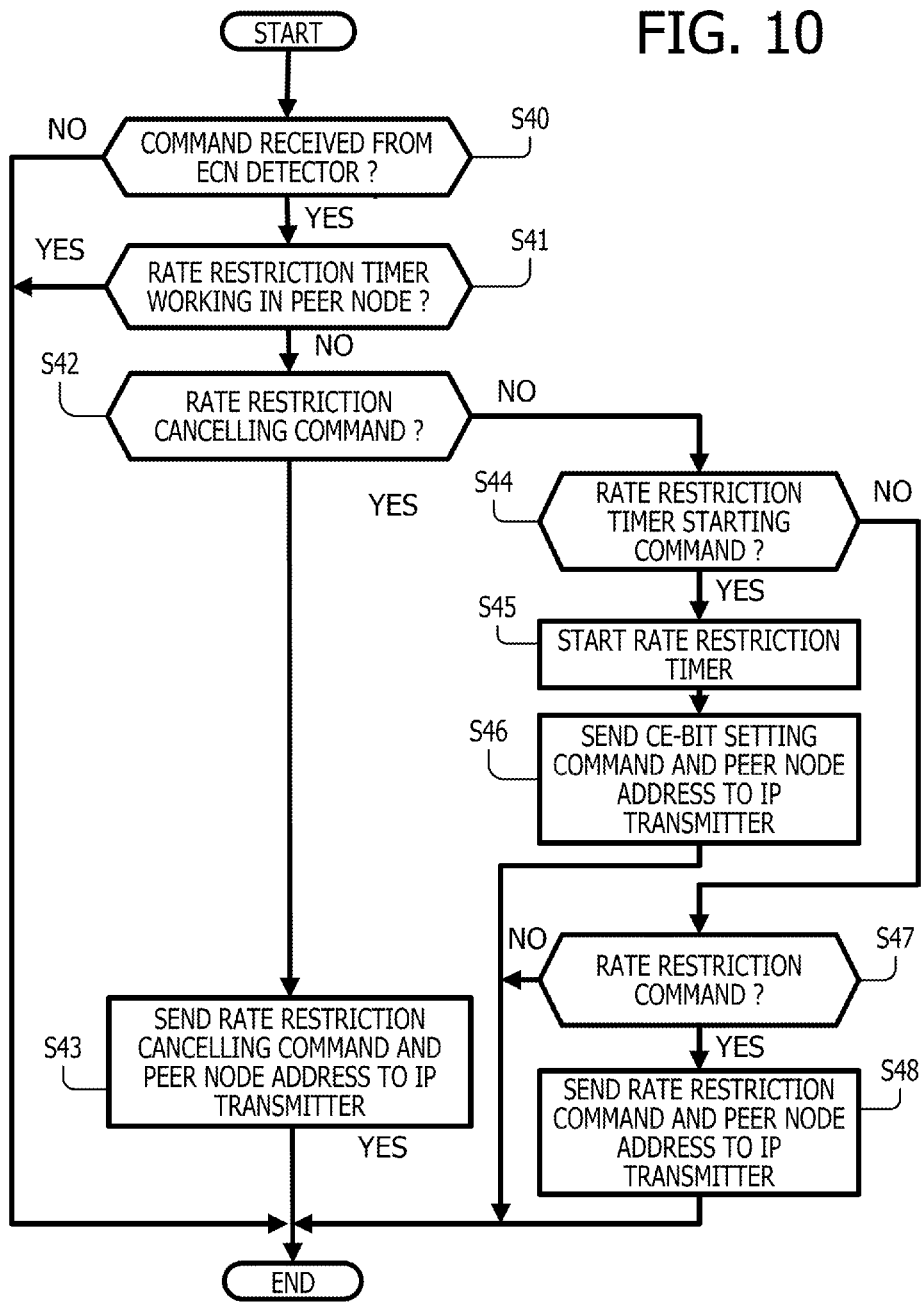
FIG. 10 is a diagram illustrating an example of an operational flowchart for transmission rate determining processing, according to a second embodiment.
Figure 11:
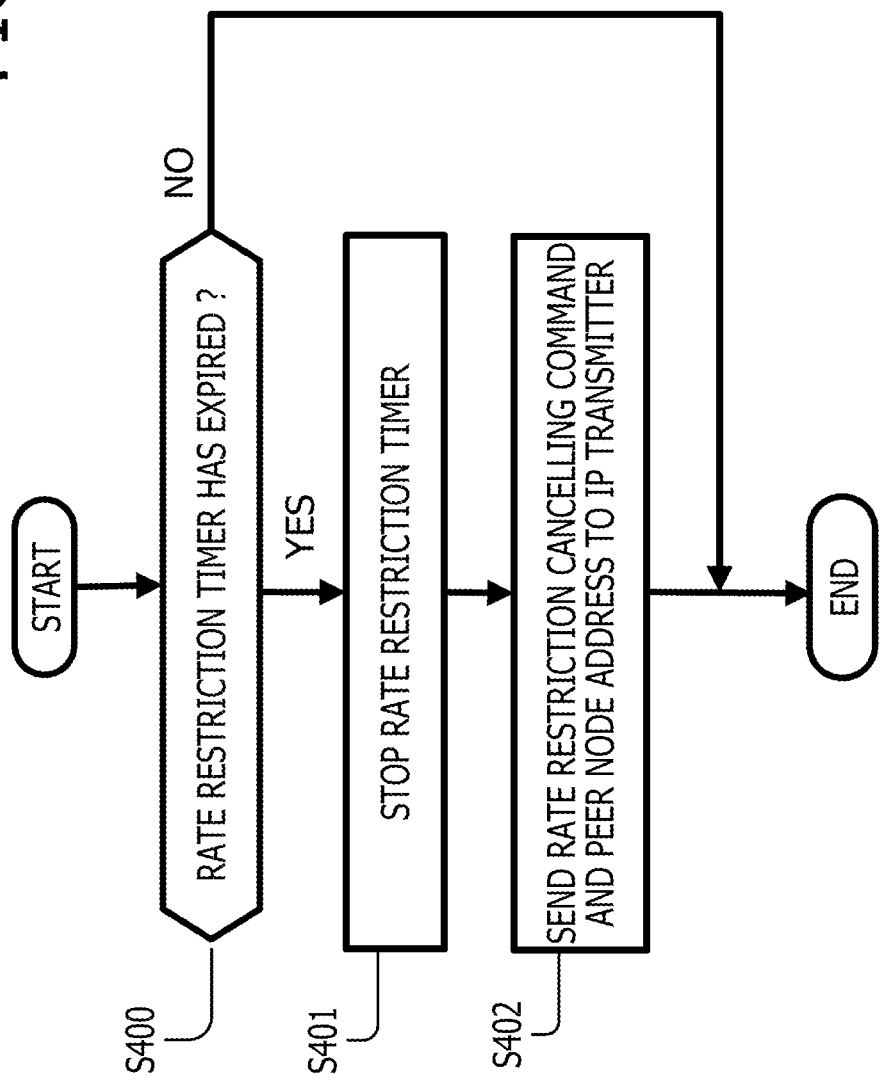
FIG. 11 is a diagram illustrating an example of an operational flowchart for transmission rate restriction timer processing, according to a second embodiment.

Next, descriptions will be given of transmission rate determining processing executed by a communication apparatus 100, with reference to FIGS. 10 and 11. FIG. 10 is a diagram illustrating an example of an operational flowchart for transmission rate determining processing, according to a second embodiment, and FIG. 11 is a diagram illustrating an example of an operational flowchart for transmission rate restriction timer processing, according to a second embodiment. Here, the transmission rate determining processing is performed by a transmission rate controller 124 of the IP transmitter 120 provided for the communication apparatus 100.

In operation S40, the transmission rate controller 124 determines whether there exists a command received from the ECN detector 151. The transmission rate controller 124 proceeds to operation S41 when there exists the received command (YES), and ends the transmission rate determining processing when there exists no commands received (NO).

In operation S41, the transmission rate controller 124 determines whether the command received from the ECN detector 151 targets a peer edge node in which the transmission rate restriction timer is working, in other words, whether the transmission rate restriction timer is working on a peer edge node targeted by the command. The transmission rate controller 124 ends the transmission rate determining processing when the transmission rate restriction timer is working on the peer edge node targeted by the received command (YES in operation S41), and proceeds to operation S42 when the transmission rate restriction timer is not working on the peer edge node targeted by the received command (NO in operation S41).

Here, a transmission rate restriction timer may be implemented by executing the transmission rate restriction timer processing at the time of detecting a timer interruption. The transmission rate restriction timer processing determines, at the time of detecting a timer interruption, whether the transmission rate restriction timer has expired or not (in operation S400). When it is determined that the transmission rate restriction timer has expired (YES in operation S400), the transmission rate restriction timer processing stops the transmission rate restriction timer (in operation S401), issues "a transmission rate restriction cancelling command" for the targeted peer edge node (in operation S402), and ends the transmission rate restriction timer processing. Meanwhile, when it is determined that the transmission rate restriction timer has not expired yet (NO in operation S400), the transmission rate restriction timer processing ends the processing thereof.

As mentioned above, a transmission rate controller 124 is provided with a transmission rate restriction timer, and cancels the restriction on the transmission rate when a given time period has elapsed from the time at which the restriction is imposed on the transmission rate, so that appropriate restriction is imposed on the transmission rate even in the case of using a UDP in which handshaking is not performed.

In operation S42, the transmission rate controller 124 proceeds to operation S43 when the command received from the ECN detector 151 is a "transmission rate restriction cancelling command" (YES in operation S42), and proceeds to operation S44 when the command is not a "transmission rate cancelling command" (NO in operation S42).

In operation S43, the transmission rate controller 124 sends to the IP transmitter 120 a "peer node IP address" and a "transmission rate restriction cancelling command", and ends the transmission rate determining processing.

In operation S44, the transmission rate controller 124 proceeds to operation S45 when the command received from the ECN detector 151 is a "transmission rate restriction timer starting command" (YES in operation S44), and proceeds to operation S47 when the received command is not a "transmission rate restriction timer starting command" (NO in operation S44).

In operation S45, the transmission rate controller 124 starts a transmission rate restriction timer with respect to the targeted peer node identified by the "peer node IP address" received from the ECN detector 151. Here, a time value set beforehand or a time value different based on a given condition such as communication conditions may be used as the time-out period of the transmission rate restriction timer.

In operation S46, the transmission rate controller 124 sends, to the IP transmitter 120 performing transmission processing, a "peer node IP address" and a "CE-bit setting command", and ends the transmission rate determining processing.

In operation S47, the transmission rate controller 124 proceeds to operation S48 when the command received from the ECN detector 151 is a "transmission rate restriction command" (YES in operation S47), and ends the transmission rate determining processing when the received command is not a "transmission rate restriction command" (NO in operation S47).

In operation S48, the transmission rate controller 124 sends to the IP transmitter 120, a "peer node IP address" and a "transmission rate restriction command", and ends the transmission rate determining processing.

Figure 12:
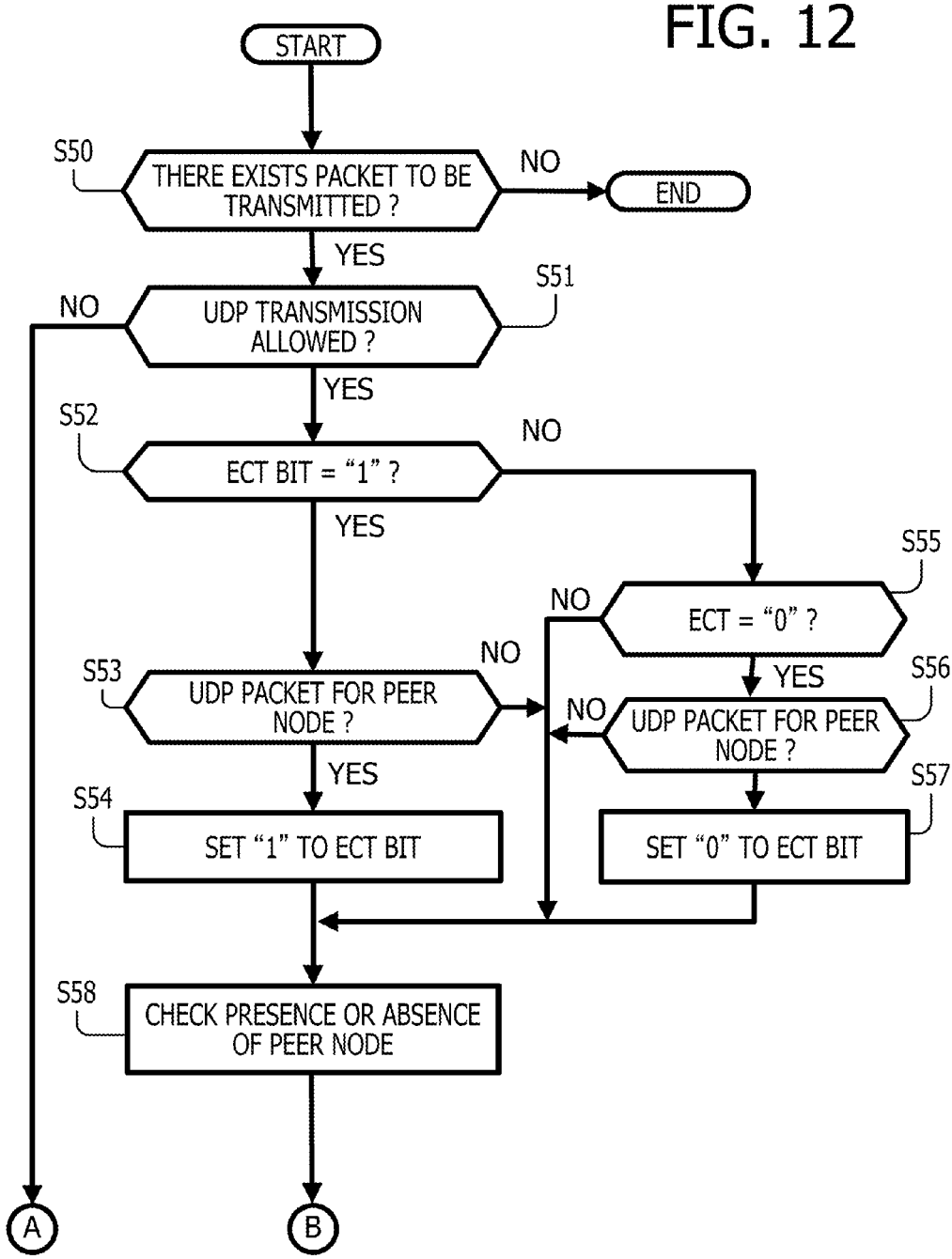
FIG. 12 is a diagram illustrating a first part of an example of an operational flowchart for transmission processing, according to a second embodiment.
Figure 13:
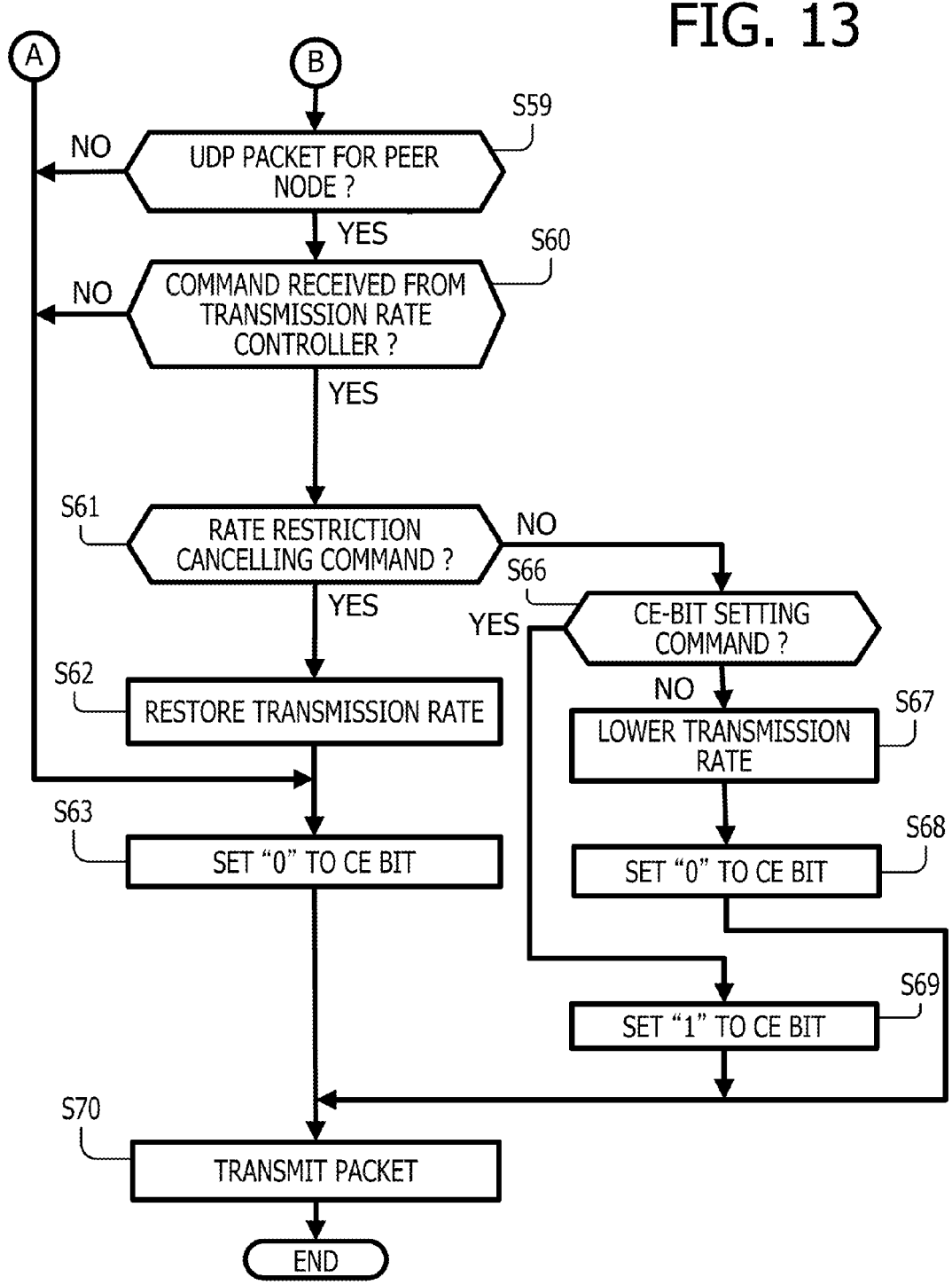
FIG. 13 is a diagram illustrating a second part of an example of an operational flowchart for transmission processing, according to a second embodiment.

FIGS. 12 and 13 are diagrams illustrating an example of an operational flowchart for transmission processing, according to a second embodiment. The communication apparatus 100 starts the transmission processing when transmission data comes up.

In operation S50, an IP transmitter 120 determines whether there exists a packet to be transmitted. The IP transmitter 120 proceeds to operation S51 when there exists a packet to be transmitted (YES), and ends the transmission processing when there exists no packets to be transmitted (NO).

In operation S51, the IP transmitter 120 determines whether data transmission based on a UDP is possible at the restricted transmission rate. The IP transmitter 120 proceeds to operation S52 when the data transmission based on a UDP is possible at the restricted transmission rate (YES), and otherwise (NO) proceeds to operation S63.

In operation S52, the IP transmitter 120 determines whether congestion occurrence (ECT bit=1) is notified by the congestion detector 150. The IP transmitter 120 proceeds to operation S53 when the congestion occurrence (ECT bit=1) is notified (YES), and proceeds to operation S55 when congestion occurrence (ECT bit=1) is not notified (NO).

In operation S53, the IP transmitter 120 determines whether the packet to be transmitted is destined for the peer edge node to which the congestion occurrence (ECT bit=1) is to be notified, and, at the same time, whether the packet to be transmitted is an IP packet using a UDP as the higher layer protocol thereof. The IP transmitter 120 proceeds to operation S54 when the above determination is affirmative (YES), and proceeds to operation S58 when the above determination is not affirmative (NO).

In operation S54, the IP transmitter 120 sets a value "1" to the ECT bit of the IP header included in the packet to be transmitted.

In operation S55, the IP transmitter 120 determines whether a normal state (ECT bit=0) is notified by the congestion detector 150. The IP transmitter 120 proceeds to operation S56 when the normal state (ECT bit=0) is notified (YES), and otherwise proceeds to operation S58 when the normal state (ECT bit=0) is not notified (NO).

In operation S56, the IP transmitter 120 determines whether or not a packet to be transmitted is destined for a node to be notified of ECT bit having a value "0" and, at the same time, the packet is an IP packet using a UDP as the higher layer thereof. The IP transmitter 120 proceeds to operation S57 when the above determination is affirmative (YES), and proceeds to operation S58 when the above determination is not affirmative (NO).

In operation S57, the IP transmitter 120 sets a value "0" to the ECT bit of the IP header included in the packet to be transmitted.

In operation S58, the IP transmitter 120 determines whether there exists a peer edge node that has caused the congestion occurrence, that is, a peer edge node to which the congestion state of the own communication apparatus 100 is to be notified.

In operation S59, the IP transmitter 120 determines whether the packet to be transmitted is an IP packet using a UDP as the higher layer thereof and destined for a peer edge node that has caused the congestion occurrence. The IP transmitter 120 proceeds to operation S60 when the above determination is affirmative (YES), and proceeds to operation S63 when the above determination is not affirmative (NO).

In operation S60, the IP transmitter 120 determines whether a command for controlling transmission rate is received from the transmission rate controller 124. The IP transmitter 120 proceeds to operation S61 when the command for controlling transmission rate is received (YES), and proceeds to operation S63 when the command for controlling transmission rate is not received (NO). Command information from the transmission rate controller 124 includes a "transmission rate restriction command", a "transmission rate restriction cancelling command", a "CE-bit setting command", and a "peer node IP address" to which the received command is to be transmitted. These commands are determined in the transmission rate determining processing that is performed by the transmission rate controller 124.

In operation S61, the IP transmitter 120 proceeds to operation S62 when the command received from the transmission rate controller 124 is a "transmission rate restriction cancelling command" for the targeted peer edge node (YES), and otherwise proceeds to operation S66 (NO).

In operation S62, upon receiving the "transmission rate restriction cancelling command" for the targeted peer edge node, the IP transmitter 120 restores the transmission rate thereof to the original normal rate.

In operation S63, the IP transmitter 120 sets a value "0" to the CE bit in the IP header of the packet to be transmitted.

In operation S66, the IP transmitter 120 proceeds to operation S69 when a "CE-bit setting command" is received from the transmission rate controller 124 (YES), and otherwise (NO) proceeds to operation S67.

In operation S67, since in the case it is determined that the "transmission rate restriction command for the targeted peer edge node was received from the transmission rate controller 124, the IP transmitter 120 restricts the transmission rate for the targeted peer edge node.

In operation S68, the IP transmitter 120 sets a value "0" to the CE bit in the IP header of the IP packet to be transmitted, and proceeds to operation S70.

In operation S69, the IP transmitter 120 sets a value "1" to the CE bit in the IP header of the IP packet to be transmitted, and proceeds to operation S70.

In operation S70, the IP transmitter 120 transmits the IP packet to the targeted peer edge node, and ends the transmission processing.

Figure 14:
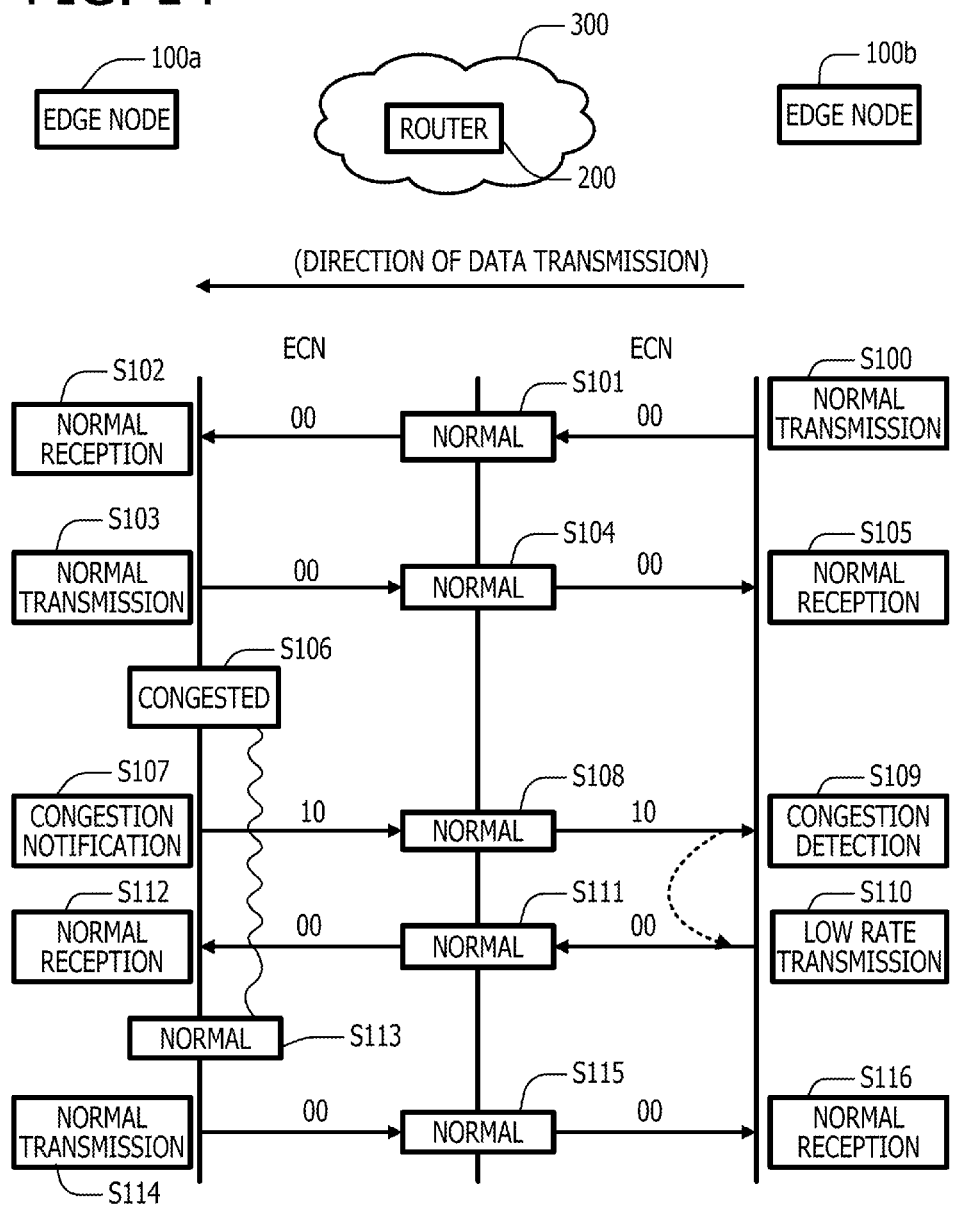
FIG. 14 is a diagram illustrating an example of an operational flow of ECN processing, according to a second embodiment.

Next, an operational flow of an ECN processing will be described with reference to FIG. 14 on the assumption that congestion is occurring in one of edge nodes 100a and 100b between which data transmission is to be performed, and an intermediate router along the communication route between the edge nodes 100a and 100b is in a normal state (not in a congested state). FIG. 14 is a diagram illustrating an example of an operational flow of ECN processing, according to an embodiment, in which congestion is occurring in one of a pair of edge nodes between which data transmission is performed and an intermediate router along the communication route between the pair of edge nodes is in a normal state (not in a congested state).

In FIG. 14, it is assumed that edge nodes 100a and 100b are coupled via an IP network 300, and a large amount of data is transmitted from the node 100b to the node 100a based on a UDP protocol. The IP network 300 includes an intermediate router 200 as an element for constituting the IP network 300. The router 200 is positioned along the communication route between the edge nodes 100a and 100b.

In operation S100, the edge node 100b sets a 2-bit value "00" (ECT bit=0, CE bit=0) to the ECN (ECT/CE) field of an IP packet, and transmits the IP packet to the peer edge node 100a.

In operation S101, the router 200 receives the IP packet including the ECN field having the value "00" that was set by the edge node 100b in operation S100 if there exists no congestion occurring in intermediate routers (not depicted in FIG. 14) along the communication route between the edge nodes 100a and 100b. In the case, since the router 200 is in a normal state (not congested), the router 200 transmits to the edge node 100a the IP packet in which a 2-bit value "00" is stored in the ECN field.

In operation S102, the edge node 100a normally receives the IP packet. The edge node 100a recognize that no congestion is occurring in the peer edge node 100b since the ECT bit of the ECN field (having a 2-bit value "00") is equal to "0", and further recognizes that there is no congestion occurring in intermediate routers along the communication route since the CE bit of the ECN field is also equal to "0".

In operation S103, the edge node 100a sets 2-bit value "00" to the ECN field in an IP packet, and transmits the IP packet to the peer edge node 100b. Here, data transmission based on a UDP from the edge node 100a to the peer edge node 100b does not necessarily occur in connection with data transmission based on a UDP from the edge node 100b to the edge node 100a.

In operation S104, the router 200 receives the IP packet including the ECN field having a 2-bit value "00" that was set by the edge node 100a when there exists no congestion occurring in intermediate routers (not depicted in FIG. 14) along the communication route between the edge nodes 100a and the router 200. In the case, since the router 200 is in a normal state (not congested), the router transmits the IP packet that includes the ECN field having the 2-bit value "00", to the edge node 100b.

In operation S105, the edge node 100b normally receives the IP packet. The node 100b recognizes that no congestion is occurring in the peer node 100a since the ECT bit of the ECN field (having 2-bit value "00") is equal to "0", and further recognizes that there is no congestion occurring in intermediate routers along the communication route since the CE bit of the ECN field is also equal to "0".

In operation S106, congestion occurs in the edge node 100a. Here, it is assumed that the peer edge node 100b was determined as one of peer edge nodes that have caused the congestion in the node 100a.

In FIG. 14, the edge node 100a may be communicating with peer edge nodes other than the peer edge node 100b, which are not depicted in FIG. 14. As a result, it is not necessarily the case that congestion occurs in the edge node 100a during the time period when the node 100a is receiving the IP packet from the peer edge node 100b. Congestion may occur in the edge node 100a a short time later after the edge node 100a has received the IP packet from the peer edge node 100b.

In operation S107, the edge node 100a informs the peer edge node 100b about congestion occurrence in the edge node 100a by setting a 2-bit value "10" to the ECN field in an IP packet and transmitting the IP packet to the peer edge node 100b. Here, the congestion occurring in the edge node 100a does not trigger data transmission based on a UDP. The edge node 100a first informs the peer edge node 100b about the congestion occurrence in the node 100a at the time when data transmission based on a UDP from the edge node 100a to the peer edge node 100b is made necessary in the edge node 100a.

In operation S108, the router 200 transfers the received IP packet to the edge node 100b without modifying the ECN field thereof since there is no congestion occurring in the router 200.

In operation S109, upon receiving the IP packet, the edge node 100b recognize that congestion is occurring in the peer edge node 100a since the ECT bit of the ECN field (having a 2-bit value "10") is equal to "1".

In operation S110, the edge node 100b sets a 2-bit value "00" to the ECN field of an IP packet, and transmits the IP packet to the peer edge node 100a at a lowered transmission rate.

In operation S111, the router 200 transfers the received IP packet to the edge node 100a without modifying the ECN field thereof since there is no congestion occurring in the router 200.

In operation S112, the edge node 100a normally receives the IP packet. In the case, the congestion occurring in the edge node 100a is expected to disappear since IP packets are transmitted from the peer edge node 100b at the lowered transmission rate.

In operation S113, the congestion disappears in the edge node 100a.

In operation S114, the edge node 100a informs the peer edge node 100b about that the congestion in the edge node 100a has disappeared, by setting a 2-bit value "00" to the ECN field in an IP packet and transmitting the IP packet to the peer edge node 100b.

In operation S115, the router 200 transfers the received IP packet to the edge node 100b without modifying the ECN field thereof since there is no congestion occurring in the router 200.

In operation S116, the edge node 100b receives the IP packet. The edge node 100b recognizes that the congestion has disappeared in the peer edge node 100a since the ECT bit of the ECN field (having 2-bit value "00") is equal to "0", and restores the current transmission rate of IP packets to the original transmission rate that was used before being lowered in operation S110.

As mentioned above, even in the case of data transmission based on a UDP, the use of ECN field allows an edge node to recognize a congestion state of the peer node thereof and to control data transmission between the edge node and the peer edge node so as to eliminate the occurred congestion.

FIG. 15 is a diagram illustrating an example of an operational flow of ECN processing, according to a second embodiment, in which congestion is occurring in both a pair of edge nodes between which communication is to be performed and an intermediate router along the communication route between the pair of edge nodes is in a normal state (not in a congested state).

In FIG. 15, it is assumed that edge nodes 100a and 100b are connected to an IP network 300, and a large amount of data is bi-directionally transmitted between the edge nodes 100a and 100b based on a UDP protocol. The IP network 300 includes an intermediate router 200 that is positioned along a communication route between the edge nodes 100a and 100b.

In operation S120, the edge node 100b sets 2-bit value "00" (ECT bit=0, CE bit=0) to the ECN field of an IP packet, and transmits the IP packet to the edge node 100a.

In operation S121, the router 200 transfers the received IP packet to the edge node 100a without modifying the ECN field thereof since there is no congestion occurring in the router 200.

In operation S122, the edge node 100a normally receives the IP packet, and recognizes that no congestion is occurring in either the peer edge node 100b or intermediate routers along the communication route since 2-bit value of the ECN field is "00".

In operation S123, the edge node 100a sets a 2-bit value "00" to the ECN field in an IP packet, and transmits the IP packet to the peer edge node 100b.

In operation S124, the router 200 transfers the received IP packet to the edge node 100b without modifying the ECN field thereof since there is no congestion occurring in the router 200.

In operation S125, the edge node 100b normally receives the IP packet, and recognizes that no congestion is occurring in either the peer edge node 100a or intermediate routers along the communication route since the 2-bit value of the ECN field is "00".

In operation S126, congestion has occurred in the edge node 100a, and it is assumed that the edge node 100b was determined as one of peer edge nodes that have caused the congestion in the edge node 100a.

In operation S127, congestion has occurred in the edge node 100b, and it is assumed that the edge node 100a was determined as one of peer edge nodes that have caused the congestion in the edge node 100b.

In operation S128, the edge node 100a informs the peer edge node 100b about the congestion occurrence in the edge node 100a by setting a 2-bit value "10" to the ECN field of an IP packet and transmitting the IP packet to the peer edge node 100b.

In operation S129, the router 200 transfers the received IP packet to the edge node 100b without modifying the ECN field thereof since there is no congestion occurring in the router 200.

In operation S130, upon receiving the IP packet, the edge node 100b recognize that congestion is occurring in the peer edge node 100a since the ECT bit of the ECN field (having a 2-bit value "10") is equal to "1".

In operation S131, the edge node 100b informs the peer edge node 100a about the congestion occurrence in the edge node 100b by setting a 2-bit value "10" to the ECN field of an IP packet and transmitting the IP packet to the peer edge node 100a. Here, the edge node 100b transmits the IP packet to the peer edge node 100a at a lowered transmission rate since the edge node 100b has recognized the congestion occurrence in the edge node 100a in operation S130.

In operation S132, the router 200 transfers the received IP packet to the edge node 100a without modifying the ECN field thereof since there is no congestion occurring in the router 200.

In operation S133, upon receiving the IP packet, the edge node 100a recognize that congestion is occurring in the peer edge node 100b since the ECT bit of the ECN field (having a 2-bit value "10") is equal to "1".

In operation S134, the edge node 100a sets a 2-bit value "10" to the ECN field of an IP packet, and transmits the IP packet to the peer edge node 100b since the congested state is continuing in the edge node 100a. Here, the edge node 100a transmits the IP packet to the edge node 100b at a lowered transmission rate since the edge node 100a has recognized the congestion occurrence in the edge node 100b in operation S133.

In operation S135, the router 200 transfers the received IP packet to the edge node 100b without modifying the ECN field thereof since there is no congestion occurring in the router 200.

In operation S136, upon receiving the IP packet, the edge node 100b recognize that the congested state is continuing in the peer edge node 100a since the ECT bit of the ECN field (having 2-bit a value "10") is equal to "1".

In operation S137, the congestion is eliminated in the edge node 100b, and the edge node 100b turns from a congested state to a normal state.

In operation S138, since the congestion has been eliminated in the edge node 100b, the edge node 100b informs the peer edge node 100a about that the congestion has been eliminated in the edge node 100b by setting a 2-bit value "00" to the ECN field of an IP packet and transmitting the IP packet to the peer edge node 100a. Here, the edge node 100b transmits the IP packet to the edge node 100a at a lowered transmission rate since the edge node 100b has recognized the congestion occurrence in the edge node 100a in operation S136.

In operation S139, the router 200 transfers the received IP packet to the edge node 100a without modifying the ECN field thereof since there is no congestion occurring in the router 200.

In operation S140, upon receiving the IP packet, the edge node 100a recognizes that congestion has been eliminated in the peer edge node 100b since the ECT bit of the ECN field (having a 2-bit value "00") is equal to "0", and restores a transmission rate of IP packets to the original transmission rate.

In operation S141, the congestion is eliminated in the edge node 100a, and the edge node 100a turns from a congested state to a normal state.

In operation S142, since the congestion has been eliminated in the edge node 100a, the edge node 100a informs the peer edge node 100b about that the congestion has been eliminated in the edge node 100a by setting a 2-bit value "00" to the ECN field of an IP packet and transmitting the IP packet to the peer edge node 100b.

In operation S143, the router 200 transfers the received IP packet to the edge node 100b without modifying the ECN field thereof since there is no congestion occurring in the router 200.

In operation S144, upon receiving the IP packet, the edge node 100b recognizes that congestion has been eliminated in the peer edge node 100a since the ECT bit of the ECN field (having a 2-bit value "00") is equal to "0", and restores a transmission rate of IP packets to the original transmission rate.

As mentioned above, even in the case where congestion has occurred in both a pair of end edge nodes, the use of ECN field allows the pair of edge nodes to recognize a congestion state of the peer edge node thereof and to control data transmission between the edge node and the peer edge node so as to eliminate the occurred congestion.

FIG. 16 is a diagram illustrating an example of an operational flow of ECN processing, according to a second embodiment, in which no congestion is occurring in both a pair of edge nodes between which data transmission is performed, but congestion in one direction is occurring in an intermediate router along the communication route between the pair of edge nodes.

In FIG. 16, it is assumed that edge nodes 100a and 100b are connected to an IP network 300, and a large amount of data is transmitted from the edge node 100b to the edge node 100a, based on a UDP protocol. The IP network 300 includes a router 200 that is positioned along the communication route between the edge nodes 100a and 100b.

In operation S151, the edge node 100b is in a normal state, and there is no congestion occurring in the edge node 100b.

In operation S152, the edge node 100a is in a normal state, and there is no congestion occurring in the edge node 100a.

In operation S153, the edge node 100b sets a 2-bit value "10" to the ECN field of an IP packet, and transmits the IP packet to the peer edge node 100a.

In operation S154, the router 200 transfers the received IP packet to the edge node 100a without modifying the ECN field thereof since there is no congestion occurring in the router 200.

In operation S155, the edge node 100a normally receives the IP packet, and recognizes that no congestion is occurring in either the peer edge node 100b or intermediate routers along the communication route since the ECN field of the received IP packet is equal to a 2-bit value "00".

In operation S156, the edge node 100a sets a 2-bit value "00" to the ECN field of an IP packet, and transmits the IP packet to the peer edge node 100b.

In operation S157, the router 200 transfers the received IP packet to the edge node 100b without modifying the ECN field thereof since there is no congestion occurring in the router 200.

In operation S158, upon receiving the IP packet, the edge node 100b recognizes that there is no congestion occurring in either the peer edge node 100a or intermediate routers along the communication route between the edge nodes 100a and 100b.

In operation S159, the edge node 100b sets a 2-bit value "00" to the ECN field of an IP packet, and transmits the IP packet to the peer edge node 100a.

In operation S160, since there is congestion occurring in the router 200, the router 200 sets a 2-bit value "01" to the ECN field (ECT bit, CE bit) of an IP packet, that is, sets "0" and "1" to the ECT bit and the CE bit, respectively, and transfers the IP packet to the edge node 100a.

In operation S161, upon receiving the IP packet, the edge node 100a recognizes congestion occurring in intermediate routers along the communication route since the CE bit of the ECN field (having a 2-bit value "01", that is, ECT bit is equal to "0" and CE bit is equal to "1") is equal to "1".

In operation S162, the edge node 100a sets a CE-disregard time during which a CE bit of ECN field is disregarded to a CE-disregard timer. Then, the edge node 100a starts the CE-disregard timer and monitoring a time-out of the CE-disregard timer.

In operation S163, upon receiving the CE bit having a value "1", the edge node 100a informs the peer edge node 100b about congestion occurrence in intermediate routers along the communication route by setting a 2-bit value "01" (ECT bit="0", CE bit="1") to the ECN field of an IP packet and transmitting the IP packet to the peer edge node 100b. Here, the edge node 100a transmits the IP packet to the peer edge node 100b at a lowered transmission rate since the edge node 100a has recognized the congestion occurrence in intermediate routers along the communication route in operation S161. Thus, upon receiving the CE bit having a value "1", both the edge nodes 100a and 100b will be able to lower the transmission rate thereof. Therefore, it is expected that congestion occurrence in intermediated routers along the communication route will be eliminated early since both the edge nodes 100a and 100b lower the transmission rate thereof. Here, the edge node 100a sets a value "0" to CE bit at the next time of transmitting an IP packet after once transmitting the CE bit having a value "1".

In operation S164, the router 200 transfers the received IP packet to the edge node 100b without modifying the ECN field thereof since there is no congestion occurring in the router 200.

In operation S165, upon receiving the IP packet, the edge node 100b recognize that congestion is occurring in intermediate routers along the communication route since the CE bit of the ECN field (having a 2-bit value "01") is equal to "1".

In operation S166, upon receiving the CE bit having a value "1", the edge node 100b sets a CE-disregard time to a CE-disregard timer, and starts the CE-disregard timer.

In operation S167, since the edge node 100a has informed the peer edge node 100b, in operation S163, about the congestion occurrence in intermediate routers along the communication route, the edge node 100a sets a 2-bit value "00" to the ECN field of an IP packet, and transmits the IP packet to the peer edge node 100b. This prevents occurrence of the case where the value of the CE bit included in IP packets that are transmitted between the edge nodes 100a and 100b does not become "0" endlessly. Here, the edge node 100a sets a value "0" to CE bit at the next time of transmitting an IP packet after once transmitting the CE bit having a value "1". Further, in the case, the edge node 100a transmits the IP packet to the peer edge node 100b at a lowered transmission rate during a given time period. Here, the given time period is set to a transmission rate restriction timer. The edge node 100a starts the transmission rate restriction timer and monitors a time-out of the transmission rate restriction timer.

In operation S168, the router 200 transfers the received IP packet to the edge node 100b without modifying the ECN field thereof since there is no congestion occurring in the router 200.

In operation S169, upon normally receiving the IP packet, the edge node 100b recognize that there is no congestion occurring either in the peer edge node 100a or in intermediate routers along the communication route since the ECN field is equal to a 2-bit value "00".

In operation S170, upon receiving the CE bit having a value "1", the edge node 100b informs the peer edge node 100a about congestion occurrence in intermediate routers along the communication route by setting a 2-bit value "01" (ECT bit="0", CE bit="1") to the ECN field of an IP packet and transmitting the IP packet to the peer edge node 100a. Here, the edge node 100b transmits the IP packet to the peer edge node 100a at a lowered transmission rate since the edge node 100b has received, in operation S165, the ECN field (having a 2-bit value "01") in which CE bit is set at "1" meaning congestion occurrence in intermediate routers along the communication route. At the same time, the edge node 100b starts a transmission rate restriction timer (not depicted in FIG. 16) by setting a transmission restriction time thereto.

In operation S171, the router 200 transfers the received IP packet to the edge node 100a without modifying the ECN field thereof since there is no congestion occurring in the router 200.

In operation S172, upon receiving the IP packet, the edge node 100a receives notification of congestion occurring in intermediate routers along the communication route, that is, receives the ECN field (having a 2-bit value "01") in which CE bit is equal to "1". However, the router 100a disregards the notification since the notification was received during the time period when the CE-disregard timer set in operation S162 is working.

In operation S173, since the edge node 100b has once informed, in operation S170, the peer edge node 100a about the congestion occurrence in intermediate routers along the communication route, the edge node 100b sets a 2-bit value "00" to the ECN field of an IP packet, and transmits the IP packet to the peer edge node 100a. This is because the edge node 100b sets a value "0" to CE bit at the next time of transmitting an IP packet after once transmitting the CE bit having a value "1". Further, in the case, the edge node 100b transmits the IP packet to the peer edge node 100a at a lowered transmission rate since the transmission rate restriction timer (started in operation S170) is working.

In operation S174, the router 200 transfers the received IP packet to the edge node 100a without modifying the ECN field thereof since there is no congestion occurring in the router 200.

In operation S175, the edge node 100a normally receives the IP packet, and recognizes that no congestion is occurring in either the peer edge node 100b or intermediate routers along the communication route by referring to the ECN field of the received IP packet in which a 2-bit value "00" is set.

In operation S176, the edge node 100a sets a 2-bit value "00" to the ECN field of an IP packet, and transmits the IP packet to the peer edge node 100b by restoring the lowered transmission rate to the original normal transmission rate since the transmission rate restriction timer (not depicted in FIG. 16) has been stopped due to a timed-out thereof.

In operation S177, the router 200 transfers the received IP packet to the edge node 100b without modifying the ECN field thereof since there is no congestion occurring in the router 200.

In operation S178, the edge node 100b normally receives the IP packet, and recognizes that no congestion is occurring in either the peer edge node 100a or intermediate routers along the communication route by referring to the ECN field of the received IP packet in which a 2-bit value "00" is set.

As mentioned above, even in the case where congestion has occurred in intermediate routers along the communication route, the use of ECN field allows an edge node to recognize a congestion state of intermediate routers along the communication route and to control data transmission so as to eliminate the congestion.

FIGS. 17A and 17B are diagrams illustrating an example of an operational flow of ECN processing, according to a second embodiment, in which no congestion is occurring in both a pair of edge nodes between which data transmission is to be performed, and congestion is occurring bi-directionally in intermediate routers along the communication route between the pair of edge nodes.

In FIG. 17, it is assumed that edge nodes 100a and 100b are connected to an IP network 300, and a large amount of data is transmitted bi-directionally based on a UDP protocol between the edge nodes 100b and 100a. The IP network 300 includes a router 200 that is positioned along a communication route between the edge nodes 100a and 100b.

In operation S180, the edge node 100b is in a normal state, and there is no congestion occurring in the edge node 100b.

In operation S181, the edge node 100a is in a normal state, and there is no congestion occurring in the edge node 100a.

In operation S182, the edge node 100b sets a 2-bit value "00" to the ECN field of an IP packet, and transmits the IP packet to the peer edge node 100a.

In operation S183, the router 200 transfers the received IP packet to the edge node 100a without modifying the ECN field thereof since there is no congestion occurring in the router 200.

In operation S184, the edge node 100a normally receives the IP packet, and recognizes that no congestion is occurring in either the peer edge node 100b or intermediate routers along the communication route by referencing to the ECN field of the received IP packet having a 2-bit value "00".

In operation S185, the edge node 100a sets a 2-bit value "00" to the ECN field of an IP packet, and transmits the IP packet to the peer edge node 100b.

In operation S186, the router 200 transfers the received IP packet to the edge node 100b without modifying the ECN field thereof since there is no congestion occurring in the router 200.

In operation S187, upon receiving the IP packet, the edge node 100b recognizes that there is no congestion occurring in either the peer edge node 100a or intermediate routers along the communication route between the edge nodes 100a and 100b.

In operation S188, the edge node 100b sets a 2-bit value "00" to the ECN field of an IP packet, and transmits the IP packet to the peer edge node 100a.

In operation S189, since there is congestion occurring in the router 200, the router 200 sets a 2-bit value "01" to the ECN field (ECT bit, CE bit) of an IP packet, that is, sets "0" and "1" to the ECT bit and the CE bit, respectively, and transfers the IP packet to the edge node 100a.

In operation S190, upon receiving the IP packet, the edge node 100a recognizes congestion occurring in intermediate routers along the communication route since the CE bit of the ECN field (having a 2-bit value "01") is equal to "1".

In operation S191, the edge node 100a sets a CE-disregard time during which a CE bit of ECN field is disregarded to a CE-disregard timer.

In operation S192, since the received CE bit is equal to "1", the edge node 100a informs the peer edge node 100b about congestion occurrence in intermediate routers along the communication route by setting a 2-bit value "01" (ECT bit="0", CE bit="1") to the ECN field of an IP packet and transmitting the IP packet to the peer edge node 100b. Here, the edge node 100a starts a transmission rate restriction timer (not depicted in FIG. 17A) and transmits the IP packet to the peer edge node 100b at a lowered transmission rate since the edge node 100a has recognized the congestion occurrence in intermediate routers along the communication route.

In operation S193, since there is congestion occurring in the router 200, the router 200 sets a 2-bit value "01" to the ECN field (ECT bit, CE bit) of an IP packet, and transfers the IP packet to the edge node 100a. In the case, since the router 200 receives the IP packet in which "1" is already set to the CE bit, the router 200 transmits the IP packet in which "1" is set to the CE bit regardless of the congestion occurrence in the router 200.

In operation S194, upon receiving the IP packet, the edge node 100b recognize that congestion is occurring in intermediate routers along the communication route between the edge nodes 100a and 100b by referring to the ECN field in which "1" is set to the CE bit.

In operation S195, since the received CE bit is equal to "1", the edge node 100b sets a CE-disregard time to a CE-disregard timer, and starts the CE-disregard timer.

In operation S196, since the edge node 100a has once informed, in operation S192, the peer edge node 100b about the congestion occurrence in intermediate routers along the communication route, the edge node 100a sets a 2-bit value "00" to the ECN field of an IP packet, and transmits the IP packet to the peer edge node 100b. Further, in the case, the edge node 100a transmits IP packets to the peer edge node 100b at a lowered transmission rate since the transmission rate restriction timer (not depicted in FIG. 17A) started in operation S192 is working.

In operation S197, the router 200 transfers the received IP packet to the edge node 100b by setting "1" to the CE bit of the ECN field since there is congestion occurring in the router 200.

In operation S198, upon receiving the IP packet, the edge node receives notification of congestion occurring in intermediate routers along the communication route between the edge nodes 100a and 100b, that is, receives the ECN field (having 2-bit value "01") in which CE bit is equal to "1". Here, the router 100b disregards the notification since the notification was received during the time period when the CE-disregard timer set in operation S195 is working.

In operation S199, since the edge node 100b has received the CE bit having a value "1", the edge node 100b informs the peer edge node 100a about congestion occurrence in intermediate routers along the communication route by setting a 2-bit value "01" (ECT bit="0", CE bit="1") to the ECN field of an IP packet and transmitting the IP packet to the peer edge node 100a. Here, the edge node 100b transmits the IP packet to the peer edge node 100a at a lowered transmission rate since the edge node 100b has received, in operation S194, the ECN field (having 2-bit value "01") in which "1" is set to the CE bit. At the same time, the edge node 100b starts a transmission rate restriction timer (not depicted in FIG. 17A) by setting a transmission restriction time thereto.

In operation S200, the router 200 transfers the received IP packet to the edge node 100a by setting "1" to the CE bit of the ECN field since there is congestion occurring in the router 200.

In operation S201, upon receiving the IP packet, the edge node 100a receives notification of congestion occurring in intermediate routers along the communication route between the edge nodes 100a and 100b, that is, receives the ECN field (having 2-bit value "01") in which CE bit is equal to "1". Here, the router 100a disregards the notification since the notification was received during the time period when the CE-disregard timer (not depicted in FIG. 17A) set in operation S192 is working.

In operation S202, since the edge node 100b has once informed the peer edge node 100a in operation S199 about the congestion occurrence in intermediate routers along the communication route, the edge node 100b sets a 2-bit value "00" to the ECN field of an IP packet, and transmits the IP packet to the peer edge node 100a. Here, the edge node 100b transmits IP packets to the peer edge node 100a at a lowered transmission rate since the transmission rate restriction timer (not depicted in FIG. 17A) set in operation S199 is working.

In operation S203, the router 200 transfers the received IP packet to the edge node 100a by setting "1" to the CE bit of the ECN field since there is congestion occurring in the router 200.

In operation S204, upon receiving the IP packet, the edge node 100a receives notification of congestion occurring in intermediate routers along the communication route between edge nodes 100a and 100b, that is, receives the ECN field (having 2-bit value "01") in which CE bit is equal to "1". Here, the edge node 100a disregards the notification since the notification was received during the time period when the CE-disregard timer set in operation S192 is working.

In operation S205, since the edge node 100b has once informed the peer edge node 100a in operation S170 about the congestion occurrence in intermediate routers along the communication route, the edge node 100b sets a 2-bit value "00" to the ECN field of an IP packet, and transmits the IP packet to the edge node 100a. Here, the edge node 100b transmits IP packets to the peer edge node 100a at a lowered transmission rate since the transmission rate restriction timer (not depicted in FIG. 17A) set in operation S199 is working.

In operation S206, the router 200 transfers the received IP packet to the edge node 100a by setting "1" to the CE bit of the ECN field since there is congestion occurring in the router 200.

In operation S207, upon receiving the IP packet, the edge node 100a recognizes congestion occurring in intermediate routers along the communication route since the CE bit of the ECN field (having a 2-bit value "01") is equal to "1". The edge node 100a detects the congestion occurring in intermediate routers along the communication route since the CE-disregard timer set in operation S191 has already been stopped due to the timed-out thereof.

In operation S208, since the edge node 100a has first received a CE bit having a value "1", the edge node 100a again sets the CE-disregard time to the CE-disregard timer, and starts the CE-disregard timer.

In operation S209, the edge node 100b sets a 2-bit value "00" to the ECN field of an IP packet, and transmits the IP packet to the peer edge node 100a at the original transmission rate since both the transmission rate restriction timer (not depicted in FIG. 17B) and the CE-disregard timer have been stopped due to a time-out thereof.

In operation S210, the router 200 transfers the received IP packet to the edge node 100a without modifying the ECN field thereof since there is no congestion occurring in the router 200.

In operation S211, the edge node 100a normally receives the IP packet, and recognizes that no congestion is occurring in either the peer edge node 100b or intermediate routers along the communication route by referencing to the ECN field of the received IP packet having a 2-bit value "00".

In operation S212, the edge node 100a sets a 2-bit value "00" to the ECN field of an IP packet, and transmits the IP packet to the edge node 100b at the normal transmission rate.

In operation S213, the router 200 transfers the received IP packet to the edge node 100b without modifying the ECN field thereof since there is no congestion occurring in the router 200.

In operation S214, upon normally receiving the IP packet, the edge node 100b recognizes that there is no congestion occurring in either the peer edge node 100a or intermediate routers along the communication route between the edge nodes 100a and 100b.

As mentioned above, even in the case where congestion has occurred bi-directionally in an intermediate router along the communication route, the use of ECN field allows an edge node to recognize a congestion state of intermediate routers along the communication route and to control data transmission so as to eliminate the congestion.

Figure 18B:
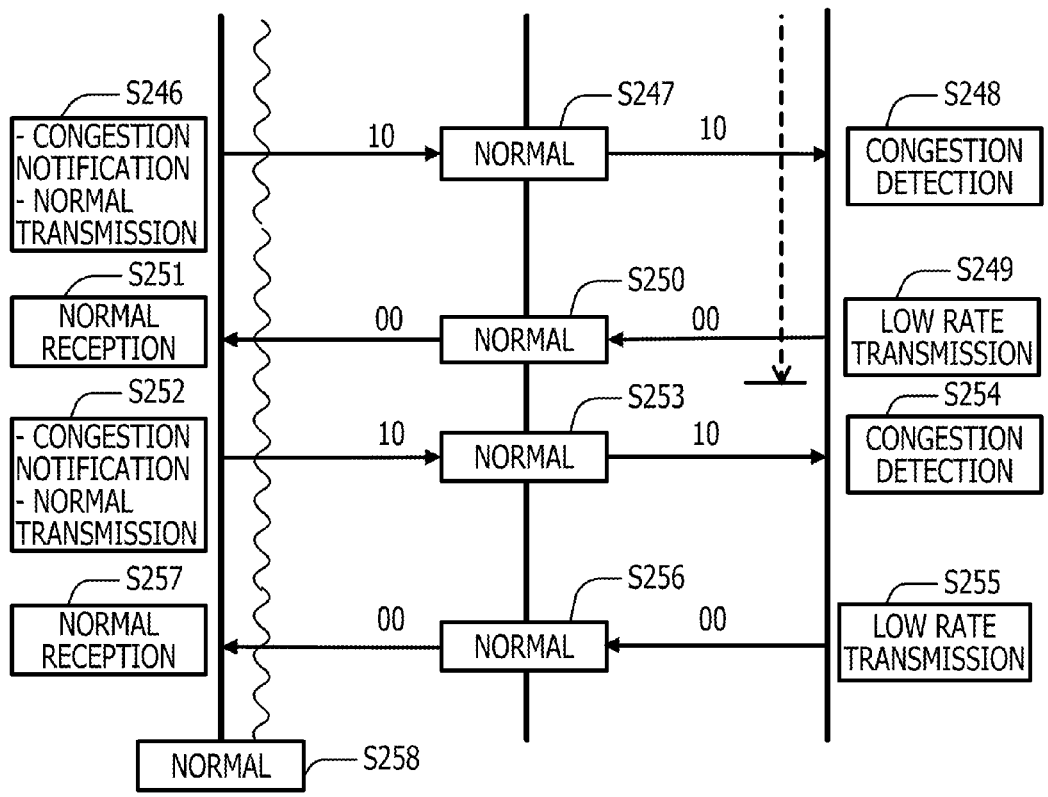

FIGS. 18A and 18B are diagrams illustrating an example of an operational flow of ECN processing, according to a second embodiment, in which congestion is occurring in both one of a pair of edge nodes and intermediate routers along the communication route between the pair of terminal edge nodes.

In FIG. 18, it is assumed that edge nodes 100a and 100b are connected to an IP network 300, and a large amount of data is transmitted bi-directionally based on a UDP protocol between the edge nodes 100b and 100a. The IP network 300 includes a router 200 that is positioned along a communication route between the edge nodes 100a and 100b.

In operation S220, the edge node 100b is in a normal state, and there is no congestion occurring in the edge router 100b.

In operation S221, the edge node 100a is in a normal state, and there is no congestion occurring in the edge node 100a.

In operation S222, the edge node 100b sets a 2-bit value "00" to the ECN field of an IP packet, and transmits the IP packet to the peer edge node 100a.

In operation S223, the router 200 transfers the received IP packet to the edge node 100a without modifying the ECN field thereof since there is no congestion occurring in the router 200.

In operation S224, the edge node 100a normally receives the IP packet, and recognizes that no congestion is occurring in either the peer edge node 100b or intermediate routers along the communication route by referencing to the ECN field of the received IP packet having a 2-bit value "00".

In operation S225, the edge node 100a sets a 2-bit value "00" to the ECN field of an IP packet, and transmits the IP packet to the peer edge node 100b.

In operation S226, the router 200 transfers the received IP packet to the edge node 100b without modifying the ECN field thereof since there is no congestion occurring in the router 200.

In operation S227, upon normally receiving the IP packet, the edge node 100b recognizes that there is no congestion occurring in either the peer edge node 100a or intermediate routers along the communication route between the edge nodes 100a and 100b.

In operation S228, congestion has occurred in the edge node 100a, and it is assumed that the edge node 100b was determined as one of peer edge nodes that have caused the congestion in the edge node 100a.

In operation S229, the edge node 100b sets a 2-bit value "00" to the ECN field of an IP packet, and transmits the IP packet to the peer edge node 100a.

In operation S230, the router 200 transfers the IP packet to the edge node 100a by setting a 2-bit value "01" to the ECN field (ECT bit, CE bit) of the IP packet since there is congestion occurring in the router 200.

In operation S231, upon receiving the IP packet, the edge node 100a recognizes congestion occurring in intermediate routers along the communication route between the edge nodes 100a and 100b by referencing to the ECN field (having a 2-bit value "01") in which the CE bit is set at "1".

In operation S232, the edge node 100a sets a CE-disregard time during which the CE bit of an ECN field is disregarded, to a CE-disregard timer, and starts the CE-disregard timer.

In operation S233, since the received CE bit is equal to "1" and there is congestion occurring in the edge node 100a, the edge node 100a sets a 2-bit value "11" (ECT bit="1", CE bit="1") to the ECN field of an IP packet, and transmits the IP packet to the peer edge node 100b. Here, the edge node 100a starts a transmission rate restriction timer and transmits the IP packet to the peer edge node 100b at a lowered transmission rate since the edge node 100a has been informed, in operation S231, about the congestion occurrence in intermediate routers along the communication route.

In operation S234, the router 200 transfers the received IP packet to the edge node 100a without modifying the ECN field thereof since there is no congestion occurring in the router 200.

In operation S235, upon receiving the IP packet, the edge node 100b recognize that congestion is occurring in an intermediate router along the communication route between the edge nodes 100a and 100b by referring to the CE bit of the ECN field, which has a value "1". The edge node 100b further recognizes that congestion is also occurring in the peer edge node 100a by referring to the ECT bit of the ECN field, which has a value "1".

In operation S 236, since the CE bit of the ECN field is set at "1", the edge node 100b set a CE disregard time to a CE-disregard timer, and starts the CE-disregard timer.

In operation S237, the edge node 100a sets a 2-bit value "10" to the ECN field of an IP packet, and transmits the IP packet to the peer edge node 100b since there is congestion occurring in the edge node 100a. Here, the CE bit is set at "0" since the CE bit having a value "1" has been once transmitted in operation S233. Further, in the case, the edge node 100a transmits IP packets to the edge node 100b at a lowered transmission rate since the transmission rate restriction timer (not depicted in FIG. 18A) started in operation S233 is working.

In operation S238, the router 200 transfers the received IP packet to the edge node 100b without modifying the ECN field thereof since there is no congestion occurring in the router 200.

In operation S239, upon receiving the IP packet, the edge node 100b recognize that congestion is occurring in the peer edge node 100a by referring to the ECT bit of the ECN field, which has a value "1".

In operation S240, since the edge node 100b has received the CE bit having a value "1" in operation S235, the edge node 100b sets a 2-bit value "01" (ECT bit="0", CE bit="1") to the ECN field of an IP packet, and transmits the IP packet to the peer edge node 100a. Here, the edge node 100b transmits the IP packet to the peer edge node 100a at a lowered transmission rate since the edge node 100b has received, in operation S235, the ECN field having a 2-bit value "11" meaning congestion occurrence both in the peer edge node 100a and in intermediate routers along the communication route.

In operation S241, the router 200 transfers the received IP packet to the edge node 100a by setting "1" to the CE bit of the ECN field since there is congestion occurring in the router 200.

In operation S242, upon receiving the IP packet, the edge node 100a receives notification of congestion occurring in intermediate routers along the communication route between the edge nodes 100a and 100b, that is, receives the ECN field (having 2-bit value "01") in which CE bit is equal to "1". Here, the router 100a disregards the notification since the CE-disregard timer started in operation S231 is working.

In operation S243, since the edge node 100b has first informed the edge node 100a in operation S240 about the congestion occurrence in intermediate routers along the communication route, the edge node 100b sets a 2-bit value "00" to the ECN field of an IP packet, and transmits the IP packet to the peer edge node 100a. Here, the edge node 100b transmits IP packets to the peer edge node 100a at a lowered transmission rate since the transmission rate restriction timer (not depicted in FIG. 18A) started in operation S240 is working.

In operation S244, the router 200 transfers the received IP packet to the edge node 100a without modifying the ECN field thereof since there is no congestion occurring in the router 200.

In operation S245, the edge node 100a normally receives the IP packet, and recognizes that there is no congestion occurring in either the peer edge node 100b or intermediate routers along the communication route by referencing to the ECN field of the received IP packet having a 2-bit value "00".

In operation S246, since the received CE bit is equal to "0" and there is congestion occurring in the edge node 100a, the edge node 100a sets a 2-bit value "10" (ECT bit="1", CE bit="0") to the ECN field of an IP packet, and transmits the IP packet to the peer edge node 100b. Here, the edge node 100a transmits the IP packet to the peer edge node 100b by restoring the lowered transmission rate to the original normal transmission rate.

In operation S247, the router 200 transfers the received IP packet to the edge node 100a without modifying the ECN field thereof since there is no congestion occurring in the router 200.

In operation S248, upon receiving the IP packet, the edge node 100b recognizes congestion occurring in the peer edge node 100a since the ECT bit of the ECN field (having 2-bit value "10") is equal to "1".

In operation S249, the edge node 100b sets a 2-bit value "00" to the ECN field of an IP packet, and transmits the IP packet to the peer edge node 100a. Here, the edge node 100b transmits IP packets to the peer edge node 100a at a lowered transmission rate since the transmission rate restriction timer started in operation S240 is working.

In operation S250, the router 200 transfers the received IP packet to the edge node 100a without modifying the ECN field thereof since there is no congestion occurring in the router 200.

In operation S251, the edge node 100a normally receives the IP packet, and recognizes that there is no congestion occurring in either the peer edge node 100b or intermediate routers along the communication route by referencing to the ECN field of the received IP packet having a 2-bit value "00".

In operation S252, the edge node 100a sets a 2-bit value "10" to the ECN field of an IP packet, and transmits the IP packet to the peer edge node 100b since the congested state is continuing in the edge node 100a.

In operation S253, the router 200 transfers the received IP packet to the edge node 100b without modifying the ECN field thereof since there is no congestion occurring in the router 200.

In operation S254, upon receiving the IP packet, the edge node 100b recognizes congestion occurring in the peer edge node 100a since the ECT bit of the ECN field (having 2-bit value "10") is equal to "1".

In operation S255, the edge node 100b sets a 2-bit value "00" to the ECN field of an IP packet, and transmits the IP packet to the peer edge node 100a. Here, although the transmission rate restriction timer has already been stopped, the edge node 100b transmits IP packets to the edge node 100a at a lowered transmission rate since the edge node 100b has detected congestion occurring in the peer edge node 100a before then.

In operation S256, the router 200 transfers the received IP packet to the edge node 100b without modifying the ECN field thereof since there is no congestion occurring in the router 200.

In operation S257, upon normally receiving the IP packet, the edge node 100b recognizes that there is no congestion occurring in either the peer edge node 100a or intermediate routers along the communication route between the edge nodes 100a and 100b.

In operation S258, the congestion is eliminated in the edge node 100a.

As mentioned above, even in the case where congestion has occurred both in one of a pair of edge nodes and in intermediate routers along the communication route, the use of ECN field allows an edge node to detect independently each congestion state of the peer edge node and the intermediate router, thereby controlling data transmission to eliminate the congestion.

According to an embodiment, a communication apparatus 100 may be configured to determine whether a UDP is used or not, based on a protocol number stored in the IP header, and to determine a peer edge node to be informed about a congestion state according to an IP address in the IP header. Even if multiple applications are executed based on a UDP, the use of a protocol number in the IP header allows monitoring a congestion state with no distinction among the multiple applications. As a result, it is possible to avoid congestion occurrence more efficiently than in the case of entrusting congestion control to the multiple applications in a higher layer.

Although the description was made with respect to the edge nodes 100a and 100b and the intermediate router 200 along the communication route, by referring to FIGS. 14 to 18, the processing described above may be performed on any one of peer edge nodes in a communication network.

Figure 19:
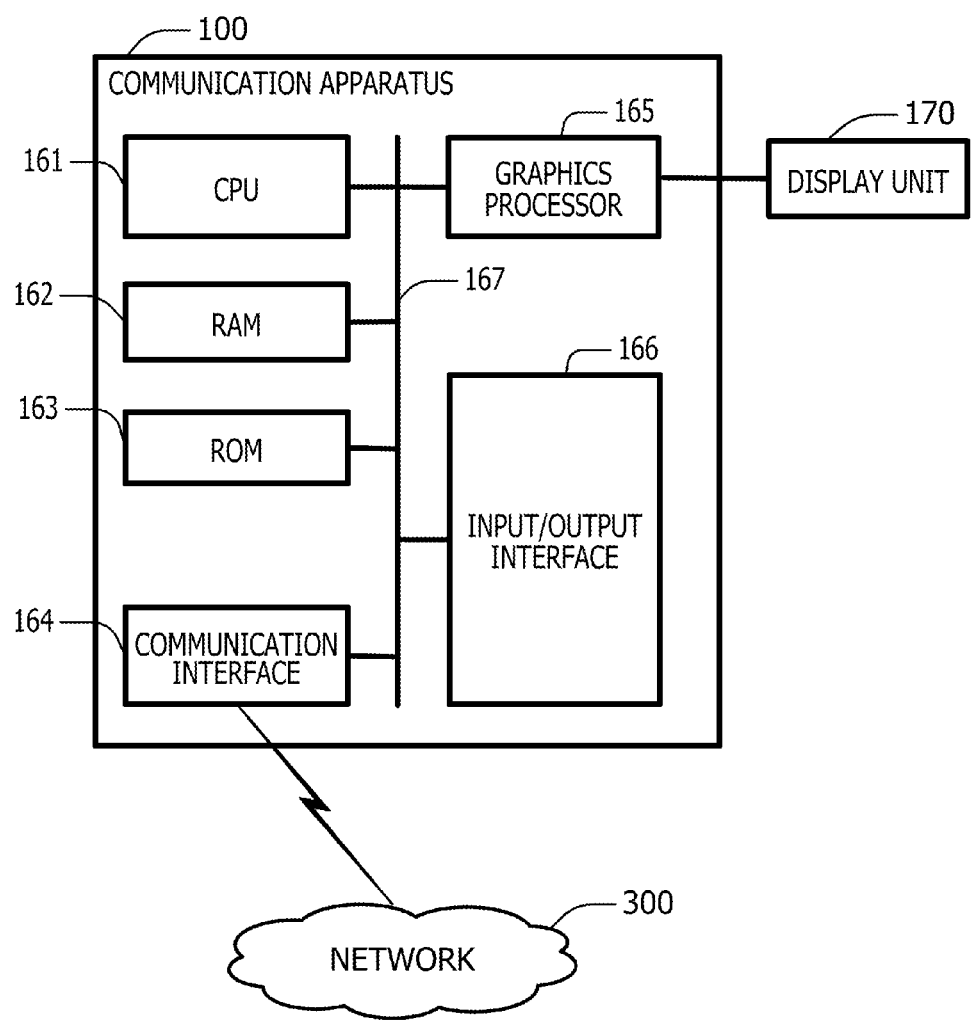
FIG. 19 is a diagram illustrating an example of a hardware configuration of a communication apparatus, according to an embodiment.

FIG. 19 is a diagram illustrating an example of a hardware configuration of a communication apparatus, according to a second embodiment. As for a communication apparatus 100, the whole apparatus is controlled by a CPU (Central Processing Unit) 161. The CPU 161 is connected to a RAM (Random Access Memory) 162, a ROM (Read Only Memory) 163, a communication interface 164, a graphics processor 165, and an input/output interface 166.

In the RAM 162, an OS program that is executed by the CPU 161 and at least a part of application programs capable of performing various processing needed for a communication apparatus, are stored temporally. Further, the RAM 162 stores various data needed for processing executed by the CPU 161. The ROM 163 stores the OS (Operating System) and application programs.

A display unit 170 is connected to the graphics processor 165. The graphic processor 165 displays, on a screen of the display unit 170, a picture image for showing information, according to instructions given by the CPU 161.

The input/output interface 166 is connected to input devices and output devices (not depicted in FIG. 19). The input/output interface 166 sends signals sent from input devices to the CPU 161 via a bus 167.

The communication interface 164 is coupled to an IP network 300. The communication interface 164 transmits/receives electric mails to/from another computer via the IP network 300.

The processing according to an embodiment may be implemented by the above mentioned hardware configuration. Further, other computers (such as a mail server and a web server) that are coupled to the communication apparatus 100 may be implemented by using the similar hardware configuration.

Here, processing executed by software that is operated on a CPU may be replaced with hardware processing that is executed by using an ASIC (Application Specific IC).

The communication apparatus 100 as described above, for example, may perform data transmission among various communication devices.

Processing as described above may be implemented by a computer. In the case, there is provided programs describing a procedure to be performed by the communication apparatus 100. The above mentioned processing may be implemented in the computer by executing the programs. The programs describing the procedure to be performed may be recorded on a recording media readable by a computer. Computer readable recording media include a magnetic-storage device, an optical memory disk, magneto-optical recording medium, and a semiconductor memory. Magnetic-storage devices include a hard disk device (HDD), a flexible disk (FD), and a magnetic tape. Optical disks include a DVD (Digital Versatile Disc), a DVD-RAM, a CD-ROM, and a CD-R (Recordable)/RW (ReWritable). Magneto-optical recording media include a MO (Magneto-Optical disk).

In the case of distributing programs, for example, transportable recording media, such as a DVD and a CD-ROM, in which the programs are recorded may be marketed. Further, it is also possible to store programs in the storage of server computers and to transfer the programs from the server computers to other computers.

A computer that executes a program, for example, stores the program recorded in a transportable recording medium or transferred from a server computer, into the memory of the computer. Then, the computer read out the stored program from the memory thereof and executes processing according to the program. It is also possible fro the computer to read out the program directly from the transportable recording medium, and to execute processing according to the program read out. Further, it is also possible that, every time a program is transferred from the server computer, the computer executes processing according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An apparatus for controlling congestion occurrence in a communication network, comprising:
   a first protocol handler configured to perform data transmission based on a first protocol between the apparatus and one or more edge nodes;
   a second protocol handler configured to perform data transmission based on a second protocol that is a connectionless protocol positioned at a protocol layer higher than the first protocol, between the apparatus and the one or more edge nodes;
   a congestion detector configured to detect a first congestion state identifying a congestion state of the apparatus;
   a peer node selector configured to select, from among the one or more edge nodes, a first peer edge node that has caused congestion occurrence in the apparatus; and
   a congestion information setting unit configured to set first congestion information identifying the detected first congestion state, to a first outgoing packet that is to be transmitted from the apparatus to the selected first peer edge node, wherein
   the first outgoing packet having the first congestion information is transmitted from the apparatus to the selected first peer edge node at the time when the second protocol handler performs data transmission based on the second protocol from the apparatus to the selected first peer edge node.

2. The apparatus of claim 1, wherein
   the congestion detector further detects a second congestion state identifying a congestion state of at least one intermediate node along a communication route between the apparatus and each of the one or more edge nodes, according to second congestion information included in an incoming packet received from the each of the one or more edge nodes;

the peer node selector selects the each of the one or more edge nodes as a second peer edge node to which the detected second congestion state is to be notified the congestion information setting unit sets the second congestion information identifying the detected second congestion state, to a second outgoing packet that is to be transmitted from the apparatus to the selected second peer edge node; and the second outgoing packet having the second congestion information is transmitted from the apparatus to the selected second peer edge node at the time when the second protocol handler performs data transmission based on the second protocol from the apparatus to the selected second peer edge node.

3. The apparatus of claim 2, wherein the congestion information setting unit sets the second congestion information to the second outgoing packet at each time of detecting the second congestion state indicating congestion occurrence in the at least one intermediate edge node along the communication route between the apparatus and the second peer edge node.

4. The apparatus of claim 2, wherein the congestion detector stops detection of the second congestion state for a given time period after once detecting the second congestion state indicating congestion occurrence in the at least one intermediate node along the communication route between the apparatus and the second peer edge node.

5. The apparatus of claim 1, wherein
the first protocol is an internet protocol (IP); and
the first congestion information is set to an ECN capable transport (ECT) bit of an explicit congestion notification (ECN) field that is included in a header of the first outgoing packet.

6. The apparatus of claim 2, wherein
the first protocol is an internet protocol (IP); and
the second congestion information is set to a congestion experienced (CE) bit of an explicit congestion notification (ECN) field that is included in a header of the second outgoing packet.

7. An apparatus for controlling congestion occurrence in a communication network, comprising:
a first protocol handler configured to perform data transmission based on a first protocol between the apparatus and one or more edge nodes;
a second protocol handler configured to perform data transmission based on a second protocol that is a connectionless protocol positioned at a protocol layer higher than the first protocol, between the apparatus and the one or more edge nodes;
a congestion detector configured to detect a first congestion state identifying a congestion state of the one or more edge nodes, according to first congestion information included in an incoming packet transmitted from the one or more edge nodes;
a peer node selector configured to select, from among the one or more edge nodes, a first peer edge node that has set the first congestion information to the incoming packet; and
a transmission rate controller configured to control a transmission rate at which data transmission based on the second protocol is performed from the apparatus to the one or more edge nodes, wherein
the transmission rate controller restricts the transmission rate at which data transmission based on the second protocol is performed from the apparatus to the selected first peer edge node when the congestion detector has detected the first congestion state indicating congestion occurrence in the first peer edge node.

8. The apparatus of claim 7, further comprising:
a congestion information setting unit configured to set second congestion information to an outgoing packet at the time when the outgoing packet is transmitted based on the second protocol from the apparatus to the one or more edge nodes, the second congestion information identifying a congestion state of at least one intermediate node along a communication route between the apparatus and each of the one or more edge nodes, wherein the congestion detector further detects a second congestion state identifying a congestion state of the at least one intermediate node along the communication route between the apparatus and the each of the one or more edge nodes by referring to the second congestion information included in the incoming packet transmitted from the each of the one or more edge nodes;

the peer node selector selects the each of the one or more edge nodes as a second peer edge node to which the detected second congestion state is to be notified;

the congestion information setting unit sets, to the outgoing packet, the second congestion information identifying the detected congestion state of the at least one intermediate node along the communication route between the apparatus and the selected second peer edge node, at the time when data transmission based on the second protocol is performed from the apparatus to the selected second peer edge node; and the transmission rate controller restricts, for a given time period, the transmission rate at which data transmission based on the second protocol is performed from the apparatus to the selected second peer edge node when the congestion detector has detected the second congestion state indicating congestion occurrence in the at least one intermediate node along the communication route between the apparatus and the selected second peer edge node.

9. The apparatus of claim 8, wherein the congestion information setting unit sets the second congestion information to the outgoing packet at each time of detecting the second congestion state indicating congestion occurrence in the at least one intermediate node along the communication route between the apparatus and the second peer edge node.

10. The apparatus of claim 8, wherein the congestion detector stops detection of the second congestion state for a given time period after once detecting the second congestion state indicating congestion occurrence in the at least one intermediate node along the communication route between the apparatus and the second peer edge nodes.

11. The apparatus of claim 7, wherein
the first protocol is an internet protocol (IP); and
the first congestion information is set to an ECN capable transport (ECT) bit of an explicit congestion notification (ECN) field that is included in a header of the incoming packet.

12. The apparatus of claim 8, wherein
the first protocol is an internet protocol (IP); and
the second congestion information is set to a congestion experienced (CE) bit of an explicit congestion notification (ECN) field that is included in each header of the incoming and outgoing packets.

13. A method for controlling congestion occurrence in a communication network when performing data transmission based on a first protocol between a first edge node and a second edge node, comprising:

detecting, by the first edge node, a first congestion state identifying a congestion state of the first edge node;

setting, by the first edge node, first congestion information identifying the detected first congestion state, to a first packet that is to be transmitted from the first edge node to the second edge node; and transmitting, by the first edge node, the first packet having the first information to the second edge node at the time when the first terminal edge node performs data transmission based on a second protocol from the first edge node to the second edge node, wherein the second protocol is a connectionless protocol positioned at a protocol layer higher than the first protocol.

14. The method of claim 13, further comprising:

detecting, by the second edge node, the first congestion state identifying a congestion state of the first edge nodes, according to the first congestion information included in the first packet transmitted from the first edge node;

restricting, by the second edge node, a transmission rate at which data transmission based on the second protocol is performed from the second edge node to the first edge node when the second edge node has detected the first congestion state indicating congestion occurrence in the first edge node.

15. The method of claim 13, wherein the first protocol is an internet protocol (IP); and the first congestion information is set to an ECN capable transport (ECT) bit of an explicit congestion notification (ECN) field that is included in a header of the first packet.

16. The method of claim 14, further comprising:

detecting, by the first edge node, a second congestion state identifying a congestion state of at least one intermediate node along a communication route between the first and second edge nodes, according to second congestion information included in a second packet transmitted from the second edge node;

setting, by the first edge node, the second congestion information identifying the detected second congestion state, to a third packet;

transmitting, by the first edge node, the third packet having the second congestion information to the second edge node at the time when the first edge node performs data transmission based on the second protocol from the first edge node to the second edge node;

detecting, by the second edge node, the second congestion state identifying a congestion state of the at least one intermediate node along the communication route between the first and second edge nodes by referring to the second congestion information included in the third packet transmitted from the first edge node;

restricting, by the second edge node, for a given time period, the transmission rate at which data transmission based on the second protocol is performed from the second edge node to the first edge node upon detecting the second congestion state indicating congestion occurrence in the at least one intermediate node along the communication route between the first and second edge nodes.

17. The method of claim 14, wherein the first protocol is an internet protocol (IP); and the second congestion information is set to a congestion experienced (CE) bit of an explicit congestion notification (ECN) field that is included in a header of the third packet.

\* \* \* \* \*